United States Patent
Li

(10) Patent No.: US 12,507,299 B2
(45) Date of Patent: Dec. 23, 2025

(54) COMMUNICATION METHOD AND SIDELINK DEVICE

(71) Applicant: HUAWEI TECHNOLOGIES CO., LTD., Shenzhen (CN)

(72) Inventor: Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 393 days.

(21) Appl. No.: 18/154,279

(22) Filed: Jan. 13, 2023

(65) Prior Publication Data

US 2023/0143285 A1 May 11, 2023

Related U.S. Application Data

(63) Continuation of application No. PCT/CN2020/102770, filed on Jul. 17, 2020.

(51) Int. Cl.
*H04W 76/15* (2018.01)
*H04W 28/26* (2009.01)
(Continued)

(52) U.S. Cl.
CPC ............ *H04W 76/15* (2018.02); *H04W 28/26* (2013.01); *H04W 72/0446* (2013.01); *H04W 76/14* (2018.02)

(58) Field of Classification Search
CPC . H04W 76/15; H04W 28/26; H04W 72/0446; H04W 76/14; H04W 72/25; H04W 72/02; H04W 72/40
See application file for complete search history.

(56) References Cited

U.S. PATENT DOCUMENTS

2021/0144736 A1* 5/2021 Li .................... H04W 76/14
2022/0256579 A1* 8/2022 Ji ..................... H04L 1/08
(Continued)

FOREIGN PATENT DOCUMENTS

CN 110392360 A 10/2019
WO 2020091443 A1 5/2020

OTHER PUBLICATIONS

Intel Corporation, "Resource Allocation Schemes for NR V2X Sidelink Communication", 3GPP TSG RAN WG1 Meeting #95, R1-1812491, XP051554435, Nov. 12-16, 2018, 15 pages.
(Continued)

*Primary Examiner* — Rina C Pancholi
(74) *Attorney, Agent, or Firm* — Maier & Maier, PLLC

(57) ABSTRACT

A communication method and a sidelink device. The method includes: determining, by a first sidelink device, first indication information and first sidelink resource information; and sending, by the first sidelink device, the first indication information and the first sidelink resource information to a second sidelink device, where the first indication information indicates that the first sidelink resource information includes auxiliary information, and the auxiliary information is used to assist the second sidelink device in resource selection. After receiving the first indication information and the auxiliary information, the second sidelink device can learn about a surrounding related resource status, such as channel measurement information of a resource pool, and a resource occupation status of another communication device with which the second sidelink device cannot directly communicate. The second sidelink device may perform resource selection based on the auxiliary information.

17 Claims, 7 Drawing Sheets

(51) Int. Cl.
*H04W 72/0446* (2023.01)
*H04W 76/14* (2018.01)

(56) References Cited

U.S. PATENT DOCUMENTS

2023/0082126 A1* 3/2023 Liu .................. H04W 72/40
370/329
2023/0209412 A1* 6/2023 Liu .................. H04W 4/40
370/329

OTHER PUBLICATIONS

LG Electronics, "New WID on NR Sidelink Enhancement", 3GPP TSG RAN Meeting #86, RP-193231, Dec. 9-12, 2019, 6 pages.

Fraunhofer HHI et al., "Resource Allocation for Mode 2 NR V2X", 3GPP TSG RAN WG1 #99, R1-1912289, Nov. 18-22, 2019, 9 pages.

3GPP TS 38.212, "3rd Generation Partnership Project; Technical Specification Group Radio Access Network; NR; Multiplexing and Channel Coding (Release 15)", 3GPP Organizational Partners, V15.9.0, Jun. 2020, 101 pages.

Intel Corporation, "Design of Resource Allocation Mode-2 for NR V2X Sidelink Communication", 3GPP TSG RAN WG1 Meeting #99, R1-1912205, Nov. 18-22, 2019, 32 pages.

Fraunhofer HHI et al., "Resource Allocation for Mode 2 NR V2X", 3GPP TSG RAN WG1 #98bis, R1-1910556, Oct. 14-20, 2019, 8 pages.

3GPP TS 38.214, "3rd Generation Partnership Project; Technical Specification Group Radio Access Network; NR; Physical Layer Procedures for Data (Release 16)", 3GPP Organizational Partners, V16.1.0, Mar. 2020, 151 pages.

* cited by examiner

COMMUNICATION METHOD AND SIDELINK DEVICE

CROSS-REFERENCE TO RELATED APPLICATIONS

This is a continuation of International Application No. PCT/CN2020/102770, filed on Jul. 17, 2020, the disclosure of which is hereby incorporated by reference in its entirety.

TECHNICAL FIELD

The embodiments relate to the field of communication technologies, a communication method, and a sidelink device.

BACKGROUND

Currently, a vehicle may obtain road condition information or receive an information service in time in a communication manner such as vehicle to vehicle (V2V), vehicle to infrastructure (V2I), vehicle to pedestrian (V2P), or vehicle to network (V2N). These communication manners may be collectively referred to as V2X communication.

In an internet of vehicles system, terminal devices may communicate with each other by using two resource allocation modes. In one mode, a network device schedules a sidelink transmission resource. In the other mode, a terminal device independently selects a resource. When independently selecting a resource, a terminal device needs to first sense (sensing) resources to identify available resources, and then select a resource from the available resources for data transmission. When sending ranges of two terminal devices cannot cover each other, the two terminal devices cannot discover each other. In this case, it is possible that the two terminal devices select a same resource for information transmission, causing a resource conflict.

SUMMARY

The embodiments may provide a communication method and a sidelink device, to reduce resource conflicts in V2X communication.

According to a first aspect, a communication method is provided, including: a first sidelink device determines first indication information and first sidelink resource information; and
 the first sidelink device sends the first indication information and the first sidelink resource information to a second sidelink device.

The first indication information indicates that the first sidelink resource information includes auxiliary information.

The auxiliary information is used to assist the second sidelink device in resource selection.

In a sidelink transmission scenario, the first sidelink device may be a transmit device, and the second sidelink device may be a receive device. The first indication information may have different values, and indicated content may be determined based on a value of the first indication information.

In this embodiment, the first sidelink device may send the first indication information and the first sidelink resource information to the second sidelink device. The first indication information indicates that the first sidelink resource information includes the auxiliary information. After receiving the first indication information and the auxiliary information, the second sidelink device can learn about a surrounding related resource status, such as channel measurement information of a resource pool, and a resource occupation status of another communication device with which the second sidelink device cannot directly communicate. The second sidelink device may perform resource selection based on the auxiliary information, to obtain, through resource selection, an available resource that can be used to send information, to avoid a resource conflict with another sidelink communication device.

The first indication information may be set in sidelink control information SCI. The sidelink control information SCI includes first level SCI and second level SCI, and the first level SCI includes the first indication information.

The first indication information may be a reserved bit in the first level SCI, the first indication information may be an unused code point in an MCS field in the first level SCI, or the first indication information may be an unused code point in a period field in the first level SCI. The first indication information may be a field in the second level SCI, the first indication information may be carried in a media access control (MAC) control element, or the first indication information may be carried in RRC signaling of a sidelink.

In this embodiment, an existing field in the sidelink control information SCI may be used as the first indication information, without a need to define a new field and use the new field as the first indication information, so that signaling overheads can be reduced, and a small modification is made to an existing protocol.

The first sidelink resource information may be included in the sidelink link control information SCI. The first sidelink resource information may be included in the first level SCI, and the first sidelink resource information may be indicated by using a field in the first level SCI.

The auxiliary information may include a measurement result of the first sidelink device for a timeslot and/or a sub-channel in the resource pool. After receiving the measurement result of the resource pool, the second sidelink device may perform resource selection in the resource pool based on the measurement result. Alternatively, the auxiliary information may be information about an auxiliary resource, and the auxiliary resource includes at least one of a resource reserved by the first sidelink device for the second sidelink device and a resource excluded by the first sidelink device for the second sidelink device.

The resource reserved by the first sidelink device for the second sidelink device means that the first sidelink device indicates a time-frequency resource to the second sidelink device by using the auxiliary information, and the time-frequency resource is suggested or recommended for use by the second sidelink device.

The resource excluded by the first sidelink device for the second sidelink device means that the first sidelink device indicates a time-frequency resource to the second sidelink device by using the auxiliary information, and the time-frequency resource is not suggested or recommended for use by the second sidelink device.

A value of the first indication information may be a first value, and the first value indicates that the first sidelink resource information is the auxiliary information. The auxiliary information is used to assist the second sidelink device in resource selection, to avoid a resource conflict with another communication device.

The first sidelink resource information further includes reservation information, and the reservation information indicates a resource reserved by the first sidelink device.

A value of the first indication information is a second value, and the second value indicates that the first sidelink resource information includes the auxiliary information and the reservation information.

The first sidelink device may send the first sidelink resource information in a first time window.

The first time window includes a plurality of timeslots, and the first sidelink resource information includes the reservation information sent in a first timeslot and the auxiliary information sent in a second timeslot.

The first sidelink resource information may include the reservation information sent in one first timeslot and the auxiliary information sent in one or more second timeslots; or the first sidelink resource information includes the reservation information sent in a plurality of first timeslots and the auxiliary information sent in one second timeslot.

The first sidelink resource information may include the reservation information sent in one first timeslot and the auxiliary information sent in two second timeslots; or the first sidelink resource information includes the reservation information sent in two first timeslots and the auxiliary information sent in one second timeslot.

The first sidelink device may send the first sidelink resource information in two timeslots of the first time window. The first sidelink device sends the reservation information in a first timeslot, and sends the auxiliary information in a second timeslot. The first timeslot may be earlier than the second timeslot in terms of time. In this case, the first timeslot may be the first timeslot in the first time window. Alternatively, the first timeslot may be later than the second timeslot in terms of time. In this case, the second timeslot may be the first timeslot in the first time window.

In the plurality of timeslots of the first time window, resources indicated in some timeslots may be used as reserved resources of the first sidelink device, and resources indicated in some timeslots may be used as auxiliary resources of the second sidelink device. Therefore, when data transmission of the first sidelink device in a current timeslot is correct, a subsequent remaining timeslot originally reserved for retransmission of a data packet in the current timeslot may be used to additionally indicate the auxiliary information, thereby further reducing wastes of reserved resources and improving transmission efficiency. In a possible implementation of the first aspect, the first sidelink device sends second indication information to the second sidelink device. The second indication information indicates the reservation information sent in the first timeslot and the auxiliary information sent in the second timeslot. The second indication information may be in the sidelink control information SCI. The second indication information may have different values, and the reservation information sent in the first timeslot and the auxiliary information in the second timeslot may be indicated by using a value of the second indication information.

The second indication information may be sent in the first timeslot or the second timeslot. The second indication information may be sent in only one first timeslot or only one second timeslot.

The first time window may include M timeslots, and M is an integer greater than or equal to 3.

A value of the second indication information is a first value, and the first value indicates that the first sidelink device is to send the reservation information in an $n^{th}$ timeslot of the first time window, send the auxiliary information in an $(n+G1)^{th}$ timeslot, and send the auxiliary information in an $(n+G2)^{th}$ timeslot, where n, G1, and G2 are all integers.

A relationship between n, G1, and G2 may be: $n \leq M-2$, and $1 \leq G1 < G2 \leq M-n$.

Alternatively, a value of the second indication information is a second value, and the second value indicates that the first sidelink device is to send the auxiliary information in an $n^{th}$ timeslot of the first time window, send the reservation information in an $(n-G3)^{th}$ timeslot, and send the auxiliary information in an $(n+G4)^{th}$ timeslot, where n, G3, and G4 are all integers.

A relationship between n, G3, and G4 may be: $1 < n < M$, $G3 < n$, and $G4 \leq M-n$.

Alternatively, a value of the second indication information is a third value, and the third value indicates that the first sidelink device is to send the auxiliary information in an $n^{th}$ timeslot of the first time window, send the auxiliary information in an $(n-G5)^{th}$ timeslot, and send the reservation information in an $(n-G6)^{th}$ timeslot, where n, G5, and G6 are all integers.

A relationship between n, G5, and G6 may be: $2 < n \leq M$, and $1 \leq G5 < G6 < n$.

After receiving the second indication information, the second sidelink device can learn whether information sent by the first sidelink device in each timeslot is the auxiliary information or the reservation information. Therefore, the second sidelink device can determine, based on the second indication information, whether to detect and when to detect the corresponding auxiliary information.

The second indication information may be sent in the $n^{th}$ timeslot of the first time window. In this case, when receiving the second indication information in the $n^{th}$ timeslot, the second sidelink device can learn whether information received in a current timeslot is the auxiliary information or the reservation information and whether information sent in other timeslots is the auxiliary information or the reservation information.

A value of the first indication information may be a third value, the third value indicates that the first sidelink resource information includes the reservation information and the auxiliary information, and the auxiliary resource is adjacent to the resource reserved by the first sidelink device in frequency domain. The reservation information and the auxiliary information may be resource information sent by the first sidelink device in a same timeslot. The reservation information indicates the resource reserved for the first sidelink device. The auxiliary information indicates the auxiliary resource. The auxiliary resource is the resource reserved by the first sidelink device for the second sidelink device or the resource excluded by the first sidelink device for the second sidelink device.

That the resource reserved by the first sidelink device is adjacent to the auxiliary resource in frequency domain may mean that a frequency domain end point of the resource reserved by the first sidelink device overlaps a frequency domain start point of the auxiliary resource, or a frequency domain start point of the resource reserved by the first sidelink device overlaps a frequency domain end point of the auxiliary resource. Therefore, discontinuity between the auxiliary resource and the resource reserved by the first sidelink device can be avoided, to reduce resource fragments, and improve resource usage efficiency of an entire system.

The sidelink control information SCI includes the first level SCI and the second level SCI, the first level SCI includes the reservation information, and the second level SCI includes the auxiliary information.

A value of the first indication information may be a fourth value, and the fourth value indicates that the first sidelink resource information is the reservation information. In this case, a resource indicated by the first sidelink resource information is the resource reserved by the first sidelink device, and the first sidelink resource information does not include the auxiliary information. When receiving the first indication information and the first sidelink resource information, the second sidelink device can learn that the resource indicated by the first sidelink resource information is reserved by the first sidelink device for the first sidelink device, the first sidelink device is to use the resource to perform data transmission, and the second sidelink device cannot select the resource to perform data transmission.

The first indication information may indicate, in another form, whether the auxiliary information exists in the first sidelink resource information. When a value of the first indication information falls within a first value range, the first indication information indicates that the first sidelink resource information includes the auxiliary information. The first indication information may be a field, and the field includes a source ID and/or a destination ID in the second level SCI.

In this embodiment, a process in which the first sidelink device determines the first sidelink resource information includes: the first sidelink device determines the auxiliary information based on a first priority. The first priority is the same as a service priority of the first sidelink device or a service priority of the second sidelink device.

The service priority of the first sidelink device is a priority of a service to be transmitted by the first sidelink device on a selected resource, or a priority indicated by the first sidelink device in sidelink link control information SCI. The service priority of the second sidelink device is a priority of a service to be transmitted by the second sidelink device, or a priority indicated by the second sidelink device in sidelink link control information SCI.

The first sidelink device may determine the first priority based on first information. The first information includes indication signaling on the resource pool. A plurality of signaling parameter sets are configured on the resource pool, and the indication signaling herein may be one of these signaling parameter sets.

The first sidelink device may determine the first priority based on second information. The second information includes a measurement result of the first sidelink device for channel quality.

When the channel quality is less than or equal to a first threshold, the first priority is the same as a higher priority in the service priority of the first sidelink device and the service priority of the second sidelink device; or
when the channel quality is greater than or equal to the first threshold, the first priority is the same as a lower priority in the service priority of the first sidelink device and the service priority of the second sidelink device. The first priority is determined, so that the first sidelink device can select a required resource in the auxiliary information in an optimal manner, to improve pertinence of the auxiliary information, thereby improving performance of the entire system.

The measurement result of the channel quality may be a channel busy ratio.

Alternatively, when the channel quality is less than or equal to a first threshold, the first priority is the same as the service priority of the second sidelink device; or when the channel quality is greater than or equal to the first threshold, the first priority is the same as the service priority of the first sidelink device.

In this embodiment, when a channel is relatively idle, a relatively large quantity of resources in the system are optional, and the auxiliary resource may be determined by using the higher priority as the first priority, to select as many resources as possible for the auxiliary information, thereby improving efficiency and quality of the auxiliary information. On the contrary, when a channel is relatively crowded, a relatively small quantity of resources in the system are optional, and the auxiliary resource may be determined by using the lower priority as the first priority, to reduce impact on another higher priority service when a resource is selected for determining the auxiliary information.

According to a second aspect, a sidelink device is provided, including: a processing module, where the processing module is configured to determine first indication information and first sidelink resource information; and
 a transceiver module, where the transceiver module is configured to send the first indication information and the first sidelink resource information to a second sidelink device.

The first indication information indicates that the first sidelink resource information includes auxiliary information.

The auxiliary information is used to assist the second sidelink device in resource selection.

The sidelink device in this embodiment may be a first sidelink device. In a sidelink transmission scenario, the first sidelink device may be a transmit device, and the second sidelink device may be a receive device. The first indication information may have different values, and indicated content may be determined based on a value of the first indication information.

In this embodiment, the first sidelink device may send the first indication information and the first sidelink resource information to the second sidelink device. The first indication information indicates that the first sidelink resource information includes the auxiliary information. After receiving the first indication information and the auxiliary information, the second sidelink device can learn about a surrounding related resource status, such as channel measurement information of a resource pool, and a resource occupation status of another communication device with which the second sidelink device cannot directly communicate. The second sidelink device may perform resource selection based on the auxiliary information, to obtain, through resource selection, an available resource that can be used to send information, to avoid a resource conflict with another sidelink communication device.

The first indication information may be set in sidelink control information SCI. The sidelink control information SCI includes first level SCI and second level SCI, and the first level SCI includes the first indication information.

The first indication information may be a reserved bit in the first level SCI, the first indication information may be an unused code point in an MCS field in the first level SCI, or the first indication information may be an unused code point in a period field in the first level SCI. The first indication information may be a field in the second level SCI, the first indication information may be carried in a media access control (MAC) control element, or the first indication information may be carried in RRC signaling of a sidelink. In this embodiment, an existing field in the sidelink control information SCI may be used as the first indication information, without a need to define a new field and use the new field as the first indication information, so that signaling overheads can be reduced.

The first sidelink resource information may be included in the sidelink link control information SCI. The first sidelink resource information may be included in the first level SCI, and the first sidelink resource information may be indicated by using a field in the first level SCI.

The auxiliary information may include a measurement result of the first sidelink device for a timeslot and/or a sub-channel in the resource pool. After receiving the measurement result of the resource pool, the second sidelink device may perform resource selection in the resource pool based on the measurement result. Alternatively, the auxiliary information may be information about an auxiliary resource, and the auxiliary resource includes at least one of a resource reserved by the first sidelink device for the second sidelink device and a resource excluded by the first sidelink device for the second sidelink device.

The resource reserved by the first sidelink device for the second sidelink device means that the first sidelink device indicates a time-frequency resource to the second sidelink device by using the auxiliary information, and the time-frequency resource is suggested or recommended for use by the second sidelink device.

The resource excluded by the first sidelink device for the second sidelink device means that the first sidelink device indicates a time-frequency resource to the second sidelink device by using the auxiliary information, and the time-frequency resource is not suggested or recommended for use by the second sidelink device.

A value of the first indication information may be a first value, and the first value indicates that the first sidelink resource information is the auxiliary information. The auxiliary information is used to assist the second sidelink device in resource selection, to avoid a resource conflict with another communication device.

The first sidelink resource information further includes reservation information, and the reservation information indicates a resource reserved by the first sidelink device.

A value of the first indication information is a second value, and the second value indicates that the first sidelink resource information includes the auxiliary information and the reservation information.

The first sidelink device may send the first sidelink resource information in a first time window.

The first time window includes a plurality of timeslots, and the first sidelink resource information includes the reservation information sent in a first timeslot and the auxiliary information sent in a second timeslot.

The first sidelink resource information may include the reservation information sent in one first timeslot and the auxiliary information sent in one or more second timeslots; or
the first sidelink resource information includes the reservation information sent in a plurality of first timeslots and the auxiliary information sent in one second timeslot.

The first sidelink resource information may include the reservation information sent in one first timeslot and the auxiliary information sent in two second timeslots; or the first sidelink resource information includes the reservation information sent in two first timeslots and the auxiliary information sent in one second timeslot.

The transceiver module of the first sidelink device may send the first sidelink resource information in two timeslots of the first time window. The transceiver module of the first sidelink device sends the reservation information in a first timeslot, and sends the auxiliary information in a second timeslot. The first timeslot may be earlier than the second timeslot in terms of time. In this case, the first timeslot may be the first timeslot in the first time window. Alternatively, the first timeslot may be later than the second timeslot in terms of time. In this case, the second timeslot may be the first timeslot in the first time window.

In the plurality of timeslots of the first time window, resources indicated in some timeslots may be used as reserved resources of the first sidelink device, and resources indicated in some timeslots may be used as auxiliary resources of the second sidelink device. Therefore, when data transmission of the first sidelink device in a current timeslot is correct, a subsequent remaining timeslot originally reserved for retransmission of a data packet in the current timeslot may be used to additionally indicate the auxiliary information, thereby further reducing wastes of reserved resources and improving transmission efficiency.

In a possible implementation of the first aspect, the transceiver module of the first sidelink device sends second indication information to the second sidelink device. The second indication information indicates the reservation information sent in the first timeslot and the auxiliary information sent in the second timeslot. The second indication information may be in the sidelink control information SCI. The second indication information may have different values, and the reservation information sent in the first timeslot and the auxiliary information in the second timeslot may be indicated by using a value of the second indication information.

The second indication information may be sent in the first timeslot or the second timeslot. The second indication information may be sent in only one first timeslot or only one second timeslot.

The first time window may include M timeslots, and M is an integer greater than or equal to 3.

A value of the second indication information is a first value, and the first value indicates that the transceiver module is to send the reservation information in an $n^{th}$ timeslot of the first time window, send the auxiliary information in an $(n+G1)^{th}$ timeslot, and send the auxiliary information in an $(n+G2)^{th}$ timeslot, where n, G1, and G2 are all integers.

A relationship between n, G1, and G2 may be: $n<M-2$, and $1 \leq G1 \leq G2 \leq M-n$.

Alternatively, a value of the second indication information is a second value, and the second value indicates that the transceiver module is to send the auxiliary information in an $n^{th}$ timeslot of the first time window, send the reservation information in an $(n-G3)^{th}$ timeslot, and send the auxiliary information in an $(n+G4)^{th}$ timeslot, where n, G3, and G4 are all integers.

A relationship between n, G3, and G4 may be: $1<n<M$, $G3<n$, and $G4 \leq M-n$.

Alternatively, a value of the second indication information is a third value, and the third value indicates that the transceiver module is to send the auxiliary information in an $n^{th}$ timeslot of the first time window, send the auxiliary information in an $(n-G5)^{th}$ timeslot, and send the reservation information in an $(n-G6)^{th}$ timeslot, where n, G5, and G6 are all integers.

A relationship between n, G5, and G6 may be: $2<n \leq M$, and $1 \leq G5<G6<n$.

After receiving the second indication information, the second sidelink device can learn whether information sent by the first sidelink device in each timeslot is the auxiliary information or the reservation information. Therefore, the second sidelink device can determine, based on the second indication information, whether to detect and when to detect the corresponding auxiliary information.

The second indication information may be sent in the $n^{th}$ timeslot of the first time window. In this case, when receiving the second indication information in the $n^{th}$ timeslot, the second sidelink device can learn whether information received in a current timeslot is the auxiliary information or the reservation information and whether information sent in other timeslots is the auxiliary information or the reservation information.

A value of the first indication information may be a third value, the third value indicates that the first sidelink resource information includes the reservation information and the auxiliary information, and the auxiliary resource is adjacent to the resource reserved by the first sidelink device in frequency domain. The reservation information and the auxiliary information may be resource information sent by the first sidelink device in a same timeslot. The reservation information indicates the resource reserved for the first sidelink device. The auxiliary information indicates the auxiliary resource. The auxiliary resource is the resource reserved by the first sidelink device for the second sidelink device or the resource excluded by the first sidelink device for the second sidelink device.

That the resource reserved by the first sidelink device is adjacent to the auxiliary resource in frequency domain may mean that a frequency domain end point of the resource reserved by the first sidelink device overlaps a frequency domain start point of the auxiliary resource, or a frequency domain start point of the resource reserved by the first sidelink device overlaps a frequency domain end point of the auxiliary resource. Therefore, discontinuity between the auxiliary resource and the resource reserved by the first sidelink device can be avoided, to reduce resource fragments, and improve resource usage efficiency of an entire system.

The sidelink control information SCI includes the first level SCI and the second level SCI, the first level SCI includes the reservation information, and the second level SCI includes the auxiliary information.

Alternatively, a value of the first indication information may be a fourth value, and the fourth value indicates that the first sidelink resource information is the reservation information. In this case, a resource indicated by the first sidelink resource information is the resource reserved by the first sidelink device, and the first sidelink resource information does not include the auxiliary information. When receiving the first indication information and the first sidelink resource information, the second sidelink device can learn that the resource indicated by the first sidelink resource information is reserved by the first sidelink device for the first sidelink device, the first sidelink device is to use the resource to perform data transmission, and the second sidelink device cannot select the resource to perform data transmission.

The first indication information may indicate, in another form, whether the auxiliary information exists in the first sidelink resource information. When a value of the first indication information falls within a first value range, the first indication information indicates that the first sidelink resource information includes the auxiliary information. The first indication information may be a field, and the field includes a source ID and/or a destination ID in the second level SCI.

In this embodiment, a process in which the processing module of the first sidelink device determines the first sidelink resource information includes: the processing module determines the auxiliary information based on a first priority. The first priority is the same as a service priority of the first sidelink device or a service priority of the second sidelink device.

The service priority of the first sidelink device is a priority of a service to be transmitted by the first sidelink device on a selected resource, or a priority indicated by the first sidelink device in sidelink link control information SCI. The service priority of the second sidelink device is a priority of a service to be transmitted by the second sidelink device, or a priority indicated by the second sidelink device in sidelink link control information SCI.

The processing module may determine the first priority based on first information. The first information includes indication selection signaling on the resource pool. A plurality of signaling parameter sets are configured on the resource pool, and the indication signaling in the first information herein may be one of these signaling parameter sets.

The processing module may determine the first priority based on second information. The second information includes a measurement result of the first sidelink device for channel quality.

When the channel quality is less than or equal to a first threshold, the first priority is the same as a higher priority in the service priority of the first sidelink device and the service priority of the second sidelink device; or when the channel quality is greater than or equal to the first threshold, the first priority is the same as a lower priority in the service priority of the first sidelink device and the service priority of the second sidelink device. The first priority is determined, so that the first sidelink device can select a required resource in the auxiliary information in an optimal manner, to improve pertinence of the auxiliary information, thereby improving performance of the entire system.

The measurement result of the channel quality may be a channel busy ratio.

Alternatively, when the channel quality is less than or equal to a first threshold, the first priority is the same as the service priority of the second sidelink device; or when the channel quality is greater than or equal to the first threshold, the first priority is the same as the service priority of the first sidelink device. In this embodiment, when a channel is relatively idle, a relatively large quantity of resources in the system are optional, and the auxiliary resource may be determined by using the higher priority as the first priority, to select as many resources as possible for the auxiliary information, thereby improving efficiency and quality of the auxiliary information. On the contrary, when a channel is relatively crowded, a relatively small quantity of resources in the system are optional, and the auxiliary resource may be determined by using the lower priority as the first priority, to reduce impact on another higher priority service when a resource is selected for determining the auxiliary information.

According to a third aspect, a sidelink device is provided, including: a transceiver module, configured to receive first indication information and first sidelink resource information that are sent by a first sidelink device, where
the first indication information indicates that the first sidelink resource information includes auxiliary information; and
the auxiliary information is used to assist the sidelink device in resource selection; and a processing module, configured to select a resource based on the first indication information and the auxiliary information.

According to a fourth aspect, a communication apparatus is provided, including a transceiver and a processor. The transceiver is configured to execute information receiving and sending instructions. The processor is configured to perform other steps. The communication apparatus may be configured to perform the method according to any one of the first aspect and the possible implementations of the first aspect.

According to a fifth aspect, a non-transitory computer readable storage medium is provided. A computer program is stored in the non-transitory computer readable storage medium. The program is executed by a processor to implement the method according to any one of the first aspect and the possible implementations of the first aspect.

According to a sixth aspect, a terminal device is provided. The terminal device includes a memory and a processor. The memory is configured to store instructions. The processor is configured to execute the instructions stored in the memory, and execution of the instructions stored in the memory enables the processor to perform the method according to any one of the first aspect and the possible implementations of the first aspect.

According to a seventh aspect, a communication system is provided, including the sidelink device according to the second aspect and the sidelink device according to the third aspect.

According to an eighth aspect, a computer program product including instructions is provided. The computer program product is configured to store a computer program. When the computer program is run on a computer, the computer is enabled to perform the method according to any one of the first aspect and the possible implementations of the first aspect.

DETAILED DESCRIPTION OF THE EMBODIMENTS

Figure 1:
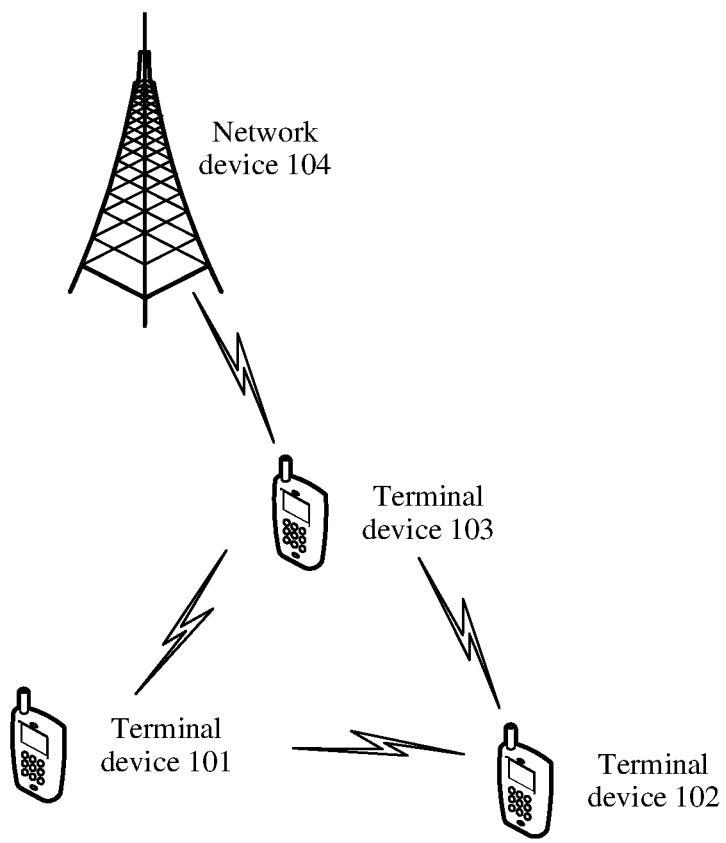
FIG. 1 is a schematic diagram of a communication system applicable to a communication method according to an embodiment.

To make objectives, solution, and advantages clearer, the following further describes the embodiments in detail with reference to the accompanying drawings.

The following describes some terms in the embodiments, to facilitate understanding of a person skilled in the art.

1. A terminal device may include a device that provides a user with voice connectivity, a device that provides a user with data connectivity, or a device that provides a user with both voice connectivity and data connectivity. For example, the terminal device may include a handheld device with a wireless connection function or a processing device connected to a wireless modem. The terminal device may be a terminal for short. The terminal may communicate with a core network by using a radio access network (RAN), and exchange voice or data with the RAN or exchange voice and data with the RAN. The terminal may include user equipment (UE), a wireless terminal, a mobile terminal, a device-to-device (D2D) terminal, a vehicle to everything (V2X) terminal, a roadside unit (RSU), a machine-to-machine/machine type communication (M2M/MTC) terminal, an internet of things (IoT) terminal, a subscriber unit, a subscriber station, a mobile station, a remote station, an access point (AP), a remote terminal, an access terminal, a user terminal, a user agent, user device, or the like. The terminal may include a mobile phone (also referred to as a "cellular" phone), a computer with a mobile terminal, a portable, pocket-sized, handheld, or computer built-in mobile apparatus, or the like. For example, the terminal device may be a device such as a personal communication service (PCS) phone, a cordless telephone set, a session initiation protocol (SIP) phone, a wireless local loop (WLL) station, or a personal digital assistant (PDA). The terminal device alternatively includes a limited device, for example, a device having low power consumption, a device having a limited storage capability, or a device having a limited computing capability. For example, the terminal device includes an information sensing device such as a barcode, a radio frequency identification (RFID), a sensor, a global positioning system (GPS), or a laser scanner.

As an example instead of a limitation, in the embodiments, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, for example, smart watches or smart glasses, and devices that focus on only one type of application function and need to work with other devices such as smartphones, such as various smart bands, smart helmets, or smart jewelry for monitoring physical signs.

If the various terminals described above are located in a vehicle (for example, placed in the vehicle or installed in the vehicle), the terminals may be all considered as vehicle-mounted terminals. For example, the vehicle-mounted terminal is also referred to as an on-board unit (OBU).

In the embodiments, an apparatus for implementing a function of the terminal may be the terminal or may be a circuit that can support the terminal in implementing the function, for example, a circuit applicable to a chip system. The chip system can be installed in the terminal. In the embodiments, the chip system may include a chip, or may include a chip and another discrete component. The embodiments may be described by using an example in which an apparatus for implementing a function of a terminal is the terminal.

2. A network device may include a radio access network (RAN) device, such as a base station (for example, an access point). The network device may be a device that communicates with a terminal device via an air interface in an access network, or a network device, namely, a roadside unit (RSU), in a vehicle to everything (V2X) technology. The base station may be configured to mutually convert a received over-the-air frame and an IP packet and serve as a router between the terminal and a rest portion of the access network, where the rest portion of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (eNB) in a long term evolution (LTE) system or a long term evolution-advanced (LTE-A) system, may include a next generation NodeB (gNB) in an evolved packet core (EPC) network, a 5th generation (5G) communication technology, a new radio (NR) system, or may include a centralized unit (CU) and a distributed unit (DU) in a cloud radio access network (Cloud RAN) system. This is not limited in this embodiment. The network device may alternatively include a core network device. The core network device includes, for example, an access and mobility management function (AMF). It should be noted that an RSU may be an RSU of a network type, or may be an RSU of a terminal device type. When being used as an RSU of a network type, the RSU performs a function of a device of the network type. When being used as an RSU of a terminal device type, the RSU performs a function of a terminal device.

3. Sidelink (SL)

In V2X, a terminal device may perform communication in two manners. In a first manner, communication is performed between terminal devices by using a Uu interface. The Uu interface is a wireless interface between a terminal device and a network device, and communication between terminal devices requires forwarding by a node such as a network device. In a second manner, sidelink communication is performed between terminal devices, that is, direct communication may be performed between the terminal devices without forwarding by a network device. In this case, a direct link between terminal devices is referred to as a sidelink.

In a sidelink technology, direct information transmission may be performed between terminal devices by using a PC5 interface between the terminal devices. The sidelink may also be represented by using a side link. This technology can provide information interaction within a coverage service area of a network device, and can also allow information interaction in a place without network device coverage. A terminal device authorized to be used for special communication can use the sidelink communication manner. The sidelink communication may be used for transmission of service data of intelligent traffic or may be used for transmission of a mobile internet service. This is not limited.

4. Sidelink Control Information (SCI)

The sidelink control information includes sidelink scheduling information or necessary indication information used during sidelink transmission, for example, indication information of a time-frequency resource block used during transmission, a modulation and coding scheme, a source identifier ID, and a target identifier ID. In NR, sidelink control information of V2X is sent in two stages. First stage SCI (the first stage SCI) is carried on a physical sidelink control channel (PSCCH) and includes information for a sensing operation and information about PSSCH resource allocation. The first stage SCI may also be referred to as first level SCI.

Second stage SCI may be carried on a physical sidelink shared channel (PSSCH). The second stage SCI (the second stage SCI) carries information required for identifying and/or decoding an associated sidelink shared channel (SL-SCH), indication information of a hybrid automatic repeat request (HARQ), trigger information of channel state information (CSI) feedback, and the like. The second stage SCI may also be referred to as second level SCI.

5. Resource Pool

In V2X, a network device may configure a resource pool for SL communication of a V2X terminal device. One resource pool is a time-frequency resource set. In V2X, two resource allocation modes are defined:

Mode 1: A network device schedules or configures a sidelink resource for a terminal device to perform sidelink transmission.

Mode 2: A terminal device independently selects a resource.

5-1. Mode 2 (Mode 2)

A basic manner of the mode 2 is that UE senses, in a (pre)configured resource pool, resources that are not used by other UE and selects an appropriate quantity of such resources for transmission of the UE. In the mode 2, V2X supports resource sensing and selection or reselection processes. In the sensing process, SCI may be further demodulated based on demodulation of SCI of another terminal device or a measurement result of another sidelink, to reflect a resource usage status on a sidelink. In the resource selection or reselection process, a resource used for sidelink transmission may be determined based on a result of the foregoing sensing process.

6. Timeslot

In an NR system, the timeslot is a minimum scheduling unit of time. The time is divided into periodic frames, and each frame is further divided into timeslots. Frames or timeslots do not overlap each other. Each timeslot is one basic communication unit. Duration of the timeslot is determined based on a subcarrier spacing used during transmission. For example, for a subcarrier spacing of 15 kHz, duration of one timeslot may be 1 ms. For another example, for a subcarrier spacing of 30 kHz, duration of one timeslot may be 0.5 ms. For another example, for a subcarrier spacing of 60 kHz, duration of one timeslot may be 0.25 ms. For another example, for a subcarrier spacing of 120 kHz, duration of one timeslot may be 0.125 ms. Optionally, when one timeslot is used as a basic scheduling unit, all symbols of one timeslot may be used for transmission, or some symbols of one timeslot may be used for transmission. This is not limited. For example, a quantity of symbols in one timeslot may be 12 or 14. In an example of 14 symbols, the last symbol may be a symbol used for sending-receiving conversion. In this case, only 13 symbols are used for sidelink transmission.

7. Channel Busy Ratio (CBR)

A definition or description of a CBR on a resource pool is used as an example. The CBR may be defined as a ratio of a quantity of unavailable sub-channels in all sub-channels in a resource pool to a quantity of all sub-channels. The unavailable sub-channel may be determined in the following manner: The terminal device measures a sub-channel. If a measurement value exceeds a configured or preconfigured preset threshold, it indicates that the sub-channel is unavailable; or if a measurement value is lower than the preset threshold, it indicates that the sub-channel is available. The measurement value is, for example, a value of a received signal strength indicator (RSSI) or reference signal received power (RSRP).

For example, if a measured RSRP or RSSI of a sub-channel is higher than the preset threshold, it indicates that the sub-channel is unavailable; or if an RSRP or RSSI of a sub-channel is lower than the preset threshold, it indicates that the sub-channel is available. A larger value of the CBR indicates a more crowded resource pool and lower reliability during transmission. A smaller value of the CBR indicates an idler resource pool and higher reliability during transmission.

8. Service Priority

The service priority is a priority of a to-be-transmitted service. A value of the priority may be determined based on a quality of service requirement of the service. The quality of service requirement includes one or more of a delay requirement, a communication distance requirement, a reliability requirement, and a rate requirement. A higher service priority indicates a more important service. The service priority may be reflected by a priority of logic information. In a sending message that indicates a service data packet, signaling in SCI may indicate a service priority. A smaller value of the priority indicated by the signaling in the SCI indicates a higher service priority. For example, when the priority indicated in the SCI is 1, a priority of corresponding service data is the highest; or when the priority indicated in the SCI is 8, a priority of corresponding service data is the lowest.

9. The embodiments may be applicable to various communication systems, for example, an LTE system, a worldwide interoperability for microwave access (WiMAX) communication system, a 5th generation (5G) system such as NR, and a future communication system such as a 6G system.

All aspects, embodiments, or features are presented by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

A network architecture and a service scenario are intended to describe the embodiments more clearly, and do not constitute any limitation on the solutions provided in the embodiments. A person of ordinary skill in the art may know that with evolution of the network architecture and emergence of a new service scenario, the embodiments may also be applicable to similar problems.

For ease of understanding the embodiments, a communication system shown in FIG. 1 is first used as an example to describe in detail a communication system applicable to the embodiments. FIG. 1 is a schematic diagram of a communication system applicable to a communication method according to an embodiment. As shown in FIG. 1, a communication system 100 includes a plurality of terminal devices, for example, a terminal device 101 to a terminal device 103. The terminal device 101, the terminal device 102, and the terminal device 103 may directly communicate with each other. For example, the terminal device 101 and the terminal device 102 may separately or simultaneously send data to the terminal device 103. The wireless communication device further includes one or more network devices, for example, a network device 104 in FIG. 1. The terminal device 101 to the terminal device 103 all can communicate with the network device 104. For example, in FIG. 1, the network device 104 communicates with the terminal device 103.

FIG. 1 schematically shows the terminal device 101 to the terminal device 103 and the network device 104 merely for ease of understanding. However, this does not constitute any limitation. Alternatively, the wireless communication system may include more network devices, or may include more or fewer terminal devices. This is not limited.

The following describes the embodiments in detail with reference to the accompanying drawings.

In the embodiments, sidelink transmission is used as an example. A resource used by a terminal device during data transmission may be scheduled based on a network device, or may be independently selected by the terminal device. When the terminal device determines a resource in an independent selection manner, a hidden terminal problem (HTP) is caused.

The following briefly describes a hidden terminal.

Figure 2:
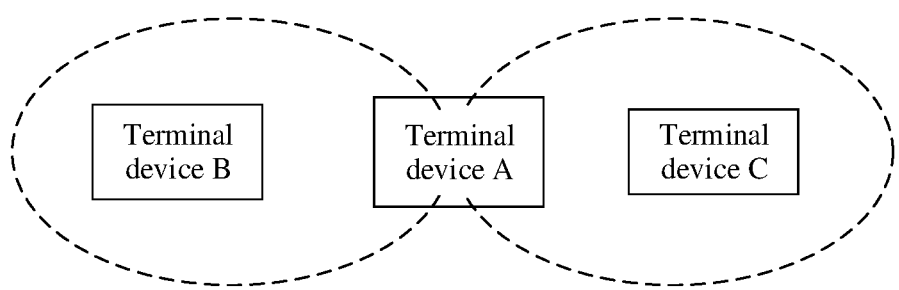
FIG. 2 is a schematic diagram of a hidden terminal according to an embodiment.

FIG. 2 is a schematic diagram of a hidden terminal according to an embodiment. Referring to FIG. 2, a terminal device B and a terminal device C are two nodes, and both the two nodes can communicate with a terminal device A. An elliptical dashed-line box in which the terminal device B is located indicates an information sending/receiving range of the terminal device B. An elliptical dashed-line box in which the terminal device C is located indicates an information sending/receiving range of the terminal device C. In FIG. 2, because the information sending/receiving ranges of the terminal device B and the terminal device C cannot cover each other, the terminal device B and the terminal device C cannot directly communicate with each other to discover each other. When the terminal device B selects a resource to perform information transmission with the terminal device A, it is possible that the terminal device C also detects the resource in an independent sensing process, and also expects to select the resource to perform information transmission. Because the terminal device B and the terminal device C cannot communicate with each other, for the resource, the terminal device C may mistakenly consider that a channel is idle and send information on the resource. In this case, interference is caused to the terminal device B, and then a resource conflict is caused.

Based on this, the embodiments may provide a communication method, to reduce a probability that a resource conflict occurs when a terminal device performs sensing, thereby improving system reliability.

Figure 3:
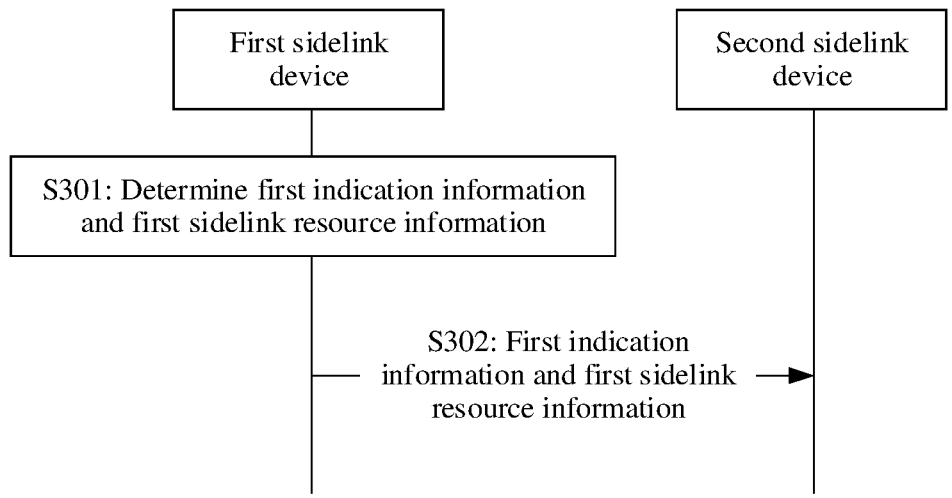
FIG. 3 is a flowchart of a communication method according to an embodiment.

FIG. 3 is a flowchart of a communication method according to an embodiment. With reference to FIG. 3, the following describes in detail the communication method provided in this embodiment. The communication method includes the following steps:

S301: A first sidelink device determines first indication information and first sidelink resource information.

S302: The first sidelink device sends the first indication information and the first sidelink resource information to a second sidelink device, where the first indication information indicates that the first sidelink resource information includes auxiliary information, and the auxiliary information is used to assist the second sidelink device in resource selection.

In this embodiment, a sidelink transmission technology is used as an example for description. In a sidelink transmission scenario, the first sidelink device may be a transmit device, and the second sidelink device may be a receive device. The first sidelink device and the second sidelink device may be devices of a same type. For example, the first sidelink device and the second sidelink device may be terminal devices. As an example in which both the first sidelink device and the second sidelink device are terminal devices, the first sidelink device may be an OBU, and the second sidelink device may be an RSU of a terminal type; or the first sidelink device is an RSU of a terminal type, and the second sidelink device is an OBU. Alternatively, the first sidelink device and the second sidelink device may be network devices.

In this embodiment, the first sidelink device may send the first indication information and the first sidelink resource information to the second sidelink device. The first indication information indicates that the first sidelink resource information includes the auxiliary information. After receiving the first indication information and the auxiliary information, the second sidelink device can learn about a related resource status, such as channel measurement information of a resource pool, and a resource occupation status of another communication device with which the second sidelink device cannot directly communicate. The second sidelink device may perform resource selection based on the auxiliary information, to obtain, through resource selection, an available resource that can be used to send information, to avoid a resource conflict with another communication device.

The following describes step 301 and step 302 with reference to example optional implementations.

For the first sidelink device and the second sidelink device in this embodiment, in a scenario of the mode 2, the first sidelink device may determine a resource, and sends information about the determined resource to the second sidelink device. The second sidelink device performs independent resource selection with reference to the received information about the resource, so that the second sidelink device determines, through independent resource selection, a resource that needs to be used by the second sidelink device. In this embodiment, the first sidelink device may be the terminal device A in FIG. 2, and the second sidelink device may be the terminal device B or the terminal device C in FIG. 2. It should be noted that this is merely an example. Alternatively, the first sidelink device and the second sidelink device may be any two sidelink communication devices on a sidelink.

The first indication information may have different values and indicated content may be determined based on a value. The first indication information has a first value, and the first value indicates that a first sidelink resource is the auxiliary information. The first indication information may be a field in sidelink control information SCI. The following briefly describes main content of the sidelink control information SCI.

The sidelink control information SCI may include first level SCI and second level SCI. The first SCI and the second SCI may be sent in two stages. The first level SCI may be carried on a PSCCH and may include information for a sensing operation and information about PSSCH resource allocation.

Table 1 shows some content of first level SCI according to an embodiment. Table 1 is an example rather than a limitation, and the first level SCI may further include other content not shown in Table 1. The first level SCI in this embodiment may alternatively have content and a format that are different from those in Table 1.

TABLE 1

Some content of the first level SCI

| Field | Bit |
| --- | --- |
| RA: frequency | 6 to 9 |
| RA: time | 5 to 9 |
| Period | 3 or 4 |
| MCS | 5 |
| Reserved bits | 2 to 4 |

In Table 1, "Field" in the first column indicates main fields in the first level SCI, and "Bit" in the second column indicates a maximum quantity of bits available for the field. The "RA: frequency" field in the second row in Table 1 indicates frequency domain information of resource allocation (RA), and 6 bits to 9 bits are available for the information. The "RA: time" field in the third row in Table 1 indicates time domain information of the resource allocation, and 5 bits to 9 bits are available for the information. "Period" in the fourth row in Table 1 indicates period information of the resource allocation, and 3 bits or 4 bits are available for the information. The MCS field in the fifth row in Table 1 indicates a modulation and coding scheme (MCS), and 5 bits are available for the information. The "Reserved bits" field in the sixth row in Table 1 is a reserved field or reserved bits, and 2 bits to 4 bits are available for the field.

According to main content that is of the first level SCI and that is shown in Table 1, the first indication information may be a reserved bit in the first level SCI. Alternatively, the first indication information may be an unused code point in the MCS field in the first level SCI. The unused code point in the MCS field is described by using an example. It may be understood from Table 1 that 5 bits are available for the MCS field. When the MCS field uses only fewer than 5 bits to indicate the modulation and coding scheme, an unused code point exists. In this case, the first indication information may be indicated by using the unused code point in the MCS field. For example, if the MCS field uses 3 bits to indicate the modulation and coding scheme, the remaining 2 bits may be used as the first indication information to indicate that the first sidelink resource information includes the auxiliary information.

Alternatively, the first indication information may be an unused code point in the period field in the first level SCI. For example, valid values of the period field are as follows:
{0-99, 100, 200, 300, 400, 500, 600, 700, 800, 900, 1000} ms Assuming that M period values are configured in a radio resource control (RRC) message or a system message, 16−M are unused code points of the period field. For example, if M=11, 5 code points can indicate another state or other information.

Alternatively, the first indication information may be a field in the second level SCI. A field may be added to the second level SCI as the first indication information, or a new format of the second level SCI may be defined, to be used as the first indication information. For example, a format of the second level SCI is SCI 2-A or SCI 2-B. Herein, SCI 2-C may be defined to indicate the first indication information. Optionally, a time-frequency resource location and/or size of the SCI 2-C may be different from those of SCI 2-A and SCI 2-B. Optionally, the SCI 2-C falls within a time-frequency resource occupied by a PSSCH.

Alternatively, the first indication information may be carried in a media access control (MAC) control element (CE), or the first indication information may be carried in RRC signaling of a sidelink, where the RRC signaling is sometimes also referred to as PC5-RRC.

The first indication information may have different values, and different values may indicate different indicated content. A value of the first indication information may be a first value. For example, the first value may be "01". The first value indicates that the first sidelink resource information sent by the first sidelink device is the auxiliary information.

In this embodiment, the first sidelink device sends the first indication information and the first sidelink resource information. The first sidelink device may sense, in a configured or preconfigured resource pool, resources that are not used by another terminal device, or resources that are used by another terminal device, or the first sidelink device may obtain information about a usage status of the resource pool. Therefore, the first sidelink device can determine the first sidelink resource information. The first sidelink resource information includes the auxiliary information. The second sidelink device performs independent resource selection and receives the first sidelink resource information and the first indication information. The first indication information indicates that the first sidelink resource information includes the auxiliary information, and the auxiliary information is used to assist the second sidelink device in resource selection, to avoid a resource conflict with another communication device.

The auxiliary information may include a measurement result of the first sidelink device for a timeslot and/or a sub-channel in the resource pool. After receiving the measurement result of the resource pool, the second sidelink device may perform resource selection in the resource pool based on the measurement result.

Alternatively, the auxiliary information may be information about an auxiliary resource, and the auxiliary resource includes at least one of a resource reserved by the first sidelink device for the second sidelink device and a resource excluded by the first sidelink device for the second sidelink device.

The resource reserved by the first sidelink device for the second sidelink device means that the first sidelink device indicates a time-frequency resource to the second sidelink device by using the auxiliary information, and the time-frequency resource is suggested or recommended for use by the second sidelink device. The second sidelink device can learn, based on the auxiliary information, whether a resource indicated by the auxiliary information can be used by the second device, and whether a resource conflict with another communication device is to occur. For the second sidelink device, the auxiliary information is only used to assist the second sidelink device in resource selection. For the resource reserved by the first sidelink device for the second sidelink device, the second sidelink device may choose to use the resource, not to use the resource, or may partially use the resource.

The resource excluded by the first sidelink device for the second sidelink device means that the first sidelink device indicates a time-frequency resource to the second sidelink device by using the auxiliary information, and the time-frequency resource is not suggested or recommended for use by the second sidelink device. In this case, the time-frequency resource may not be suggested by the first sidelink device for selection by the second sidelink device because of being occupied by another communication device or for other reasons. Therefore, a resource conflict between the second sidelink device and another communication device in a resource selection process is avoided.

The first sidelink resource information may also be set in the sidelink link control information SCI. Referring to Table 1, the first sidelink resource information may be included in the first level SCI, and the first sidelink resource information may be indicated by using a field in the first level SCI. For example, the auxiliary information in the first sidelink resource information is the information about the auxiliary resource. The auxiliary information indicates a time-frequency resource, and the resource is the auxiliary resource. The "RA: frequency" field in the first level SCI indicates frequency domain information of the auxiliary resource, the "RA: time" field in the first level SCI indicates time domain information of the auxiliary resource, and the period field in the first level SCI indicates period information of the auxiliary information. Optionally, remaining fields may indicate the auxiliary information, or may indicate parameters used during normal transmission. No enumeration is performed herein. Therefore, the second sidelink device can learn about the auxiliary resource based on the received first indication information and first sidelink resource information and perform resource selection with reference to the information about the auxiliary resource.

In this embodiment, when both the first indication information and the first sidelink resource information are included in same information, the first indication information and the first sidelink resource information can be simultaneously sent. For example, both the first indication information and the first sidelink resource information are included in the first level SCI of the sidelink link control information. Alternatively, the first indication information and the first sidelink resource information may be separately sent in different signaling.

According to the communication method provided in this embodiment, the first sidelink device sends the first indication information and the first sidelink resource information to the second sidelink device, and the second sidelink device can learn, based on the received first indication information and first sidelink resource information, that the first sidelink resource information includes the auxiliary information that assists the second sidelink device in resource selection, and then may perform resource selection based on the auxiliary information, to avoid a resource conflict with another communication device.

The first sidelink device performs sensing in the configured or preconfigured resource pool to select an available resource. The resource selected by the first sidelink device by using this process may be used by the first sidelink device. After selecting the available resource, the first sidelink device performs information transmission on the resource. To ensure information transmission reliability, a resource reserved by the first sidelink device is used for a quantity of times of retransmission. Based on this, the first sidelink resource information may further include reservation information, and the reservation information indicates the resource reserved by the first sidelink device. A value of the first indication information may be a second value different from the first value, and the second value indicates that the first sidelink resource information includes the auxiliary information and the reservation information. For example, when a value of the first indication information is "01", it indicates that the first sidelink resource information is the auxiliary information. When a value of the first indication information is the second value "10", it indicates that the first sidelink resource information includes the reservation information and the auxiliary information.

In this embodiment, the first sidelink resource information determined by the first sidelink device may include resource information sent in a plurality of timeslots in one time window. Resource information sent in one or some timeslots indicates the resource reserved by the first sidelink device, and resource information sent in one or some timeslots is auxiliary information, used to assist the second sidelink device in resource selection. Therefore, the second sidelink device can learn about resources reserved by the first sidelink device for the first sidelink device, and resources to which reference can be made during resource selection. The first sidelink resource information may include the reservation information sent in a first timeslot and the auxiliary information sent in a second timeslot. Herein, the first timeslot and the second timeslot do not indicate a time sequence and are named merely for distinguishing between the reservation information and the auxiliary information.

Figure 4:
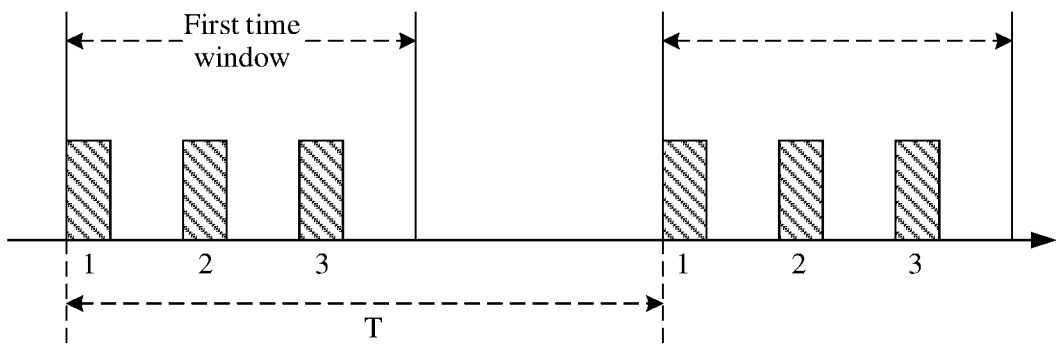
FIG. 4 is a schematic diagram in which a first sidelink device sends first sidelink resource information according to an embodiment.

FIG. 4 is a schematic diagram in which a first sidelink device sends first sidelink resource information according to an embodiment. Referring to FIG. 4, the first sidelink device sends the first sidelink resource information based on a period T, the period T includes a first time window, and a length of the first time window is less than that of the period T. The first time window includes a plurality of timeslots, and the first sidelink device sends the first sidelink resource information in the plurality of timeslots of the first time window. In FIG. 4, one rectangular box filled with oblique lines indicates one timeslot, and the first sidelink device sends resource information in the timeslot. The period T means that the first sidelink device sends the first sidelink resource information by using the time T as a repetition period, and first sidelink resource information sent in adjacent periods may indicate different content. It should be noted that, a periodic service may be sent by using the period T as an interval. T may be considered as a sending period of the periodic service, or may be considered as a reservation period in which the periodic service is to be sent. This is not limited. Optionally, for an aperiodic service, the period T may be considered as a time window. A data packet may be retransmitted for a plurality of times in a current time window. However, in a next time window, another data packet may be newly transmitted and/or retransmitted.

One period includes one first time window, and the first sidelink device sends the first sidelink resource information in the plurality of timeslots of the first time window. FIG. 4 shows, as an example, a case in which the first sidelink device sends the first sidelink resource information in three timeslots.

In the example in which the first sidelink device sends the first sidelink resource information in the three timeslots in FIG. 4, the first sidelink resource information may include the reservation information sent in one first timeslot and the auxiliary information sent in two second timeslots; or the first sidelink resource information includes the reservation information sent in two first timeslots and the auxiliary information sent in one second timeslot. The length of the first time window may be greater than three timeslots. For example, the length of the first time window may be 32 timeslots. The three timeslots in which the first sidelink device sends the first sidelink resource information may not be adjacent, or may not be distributed at equal timeslot intervals.

Table 2 shows a plurality of types of the first sidelink resource information sent in the three timeslots. A timeslot 1, a timeslot 2, and a timeslot 3 indicate, in a time sequence, the three timeslots for sending the first sidelink resource information. The timeslot 1 is earlier than the timeslot 2 in terms of time, and the timeslot 2 is earlier than the timeslot 3 in terms of time. However, the timeslots 1 to 3 do not necessarily indicate the first three timeslots in the first time window. The timeslots 1 to 3 may not be adjacent or may not be at equal timeslot intervals. The timeslot 1 may be the first timeslot in the first time window. It should be noted that, in this embodiment, six different types may be considered as six parallel optional manners of transmitting the reservation information and the auxiliary information in different timeslots, and the six types do not need to simultaneously work.

TABLE 2

Type of the first sidelink resource information sent in the three timeslots

| | Timeslot | | |
|---|---|---|---|
| Type | Timeslot 1 | Timeslot 2 | Timeslot 3 |
| Type 1 | Reservation information | Auxiliary information | Auxiliary information |
| Type 2 | Reservation information | Reservation information | Auxiliary information |
| Type 3 | Auxiliary information | Reservation information | Reservation information |
| Type 4 | Auxiliary information | Auxiliary information | Reservation information |
| Type 5 | Reservation information | Auxiliary information | Reservation information |
| Type 6 | Auxiliary information | Reservation information | Auxiliary information |

Table 2 shows a status in which the auxiliary information and the reservation information are distributed in the three timeslots when the first sidelink resource information is sent in the three timeslots in the first time window. For example, in the type 1, indication information of a transmission resource and the reservation information are sent in the timeslot 1, such as a timeslot in which the SCI is currently transmitted, so that the second sidelink device performs timely demodulation based on the information. The auxiliary information is indicated in the timeslot 2 and the timeslot 3. When data transmission in a current timeslot is correct, subsequent remaining timeslot resources that are the timeslot 2 and the timeslot 3 and that are originally reserved for retransmission of a data packet in the current timeslot may be used to additionally indicate the auxiliary information, thereby further reducing wastes of reserved resources and improving transmission efficiency. A difference between the type 2 and the type 1 is as follows: If data transmitted in the first timeslot is not correctly received, the data in the first timeslot may be further retransmitted in the following timeslot 2. When the retransmitted packet in the second timeslot is correctly received, the auxiliary information is further sent in the third timeslot. Therefore, a previously reserved resource in the timeslot 3 can also be fully utilized. However, like the type 3, when a service delay requirement of the second sidelink device is very urgent, the auxiliary information may be sent in advance in the first timeslot, and the reservation information is sent in subsequent timeslots, to preferentially provide auxiliary information for an emergent high-quality service, thereby improving performance of an entire system.

In an optional implementation, the first sidelink device may send the first sidelink resource information in two timeslots of the first time window. The first sidelink device sends the reservation information in a first timeslot, and sends the auxiliary information in a second timeslot. The first timeslot may be earlier than the second timeslot in terms of time. In this case, the first timeslot may be the first timeslot in the first time window. Alternatively, the first timeslot may be later than the second timeslot in terms of time. In this case, the second timeslot may be the first timeslot in the first time window.

It may be understood that the reservation information is a part of the first sidelink resource information. Therefore, the reservation information may also be in the sidelink link control information SCI. For example, in the type 1, the first sidelink resource information includes the reservation information sent in the timeslot 1 and the auxiliary information sent in the timeslot 2 and the timeslot 3. The reservation information in the timeslot 1 and the auxiliary information in the timeslot 2 and the timeslot 3 may have a same format and same content. For example, the reservation information in the timeslot 1 may be a field in the first level SCI, "RA: frequency" in the first level SCI indicates frequency domain information of a time-frequency resource, "RA: time" in the first level SCI indicates time domain information of the time-frequency resource, and "Period" in the first level SCI indicates period information of the time-frequency resource. The time-frequency resource indicated by the first level SCI sent in the timeslot 1 is the resource reserved for the first sidelink device. SCI of the same content is repeatedly sent in the timeslot 2 and the timeslot 3 in the first time window. In this case, time-frequency resources indicated by the first level SCI sent in the timeslot 2 and the timeslot 3 are auxiliary resources of the second sidelink device.

In an optional implementation, the first sidelink device may send second indication information to the second sidelink device. The second indication information indicates the reservation information sent in the first timeslot and the auxiliary information sent in the second timeslot. For example, the first sidelink resource information may include a plurality of pieces of reservation information sent in a plurality of timeslots of the first time window and a plurality of pieces of auxiliary information sent in a plurality of timeslots of the first time window, and the second indication information may indicate timeslots in which the reservation information is sent and timeslots in which the auxiliary information is sent. The second indication information may have different values, and the reservation information sent in the first timeslot and the auxiliary information in the second timeslot may be indicated by using a value of the second indication information.

The second indication information may be sent in the first timeslot or the second timeslot. The second indication information may be sent in only one first timeslot or only one second timeslot.

Figure 5A:
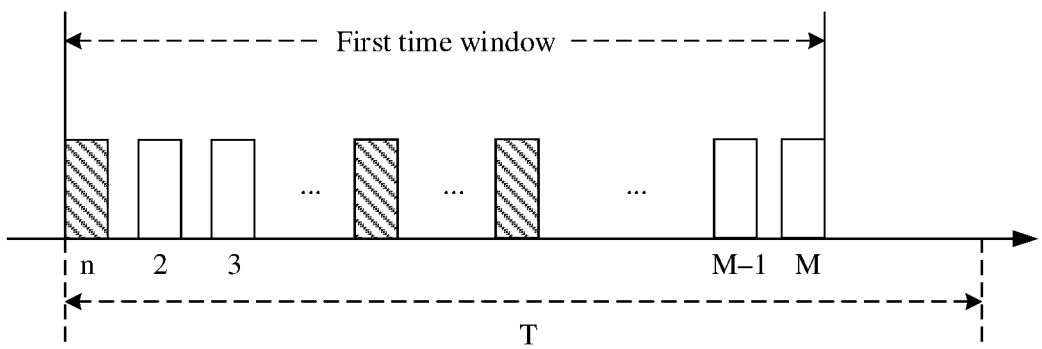
FIG. 5*a* to FIG. 5*c* are other schematic diagrams in which a first sidelink device sends first sidelink resource information according to embodiments.
Figure 5B:
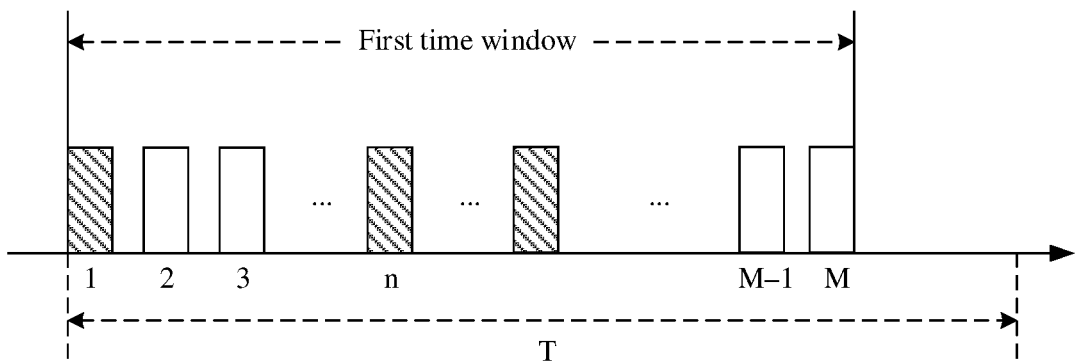
Figure 5C:
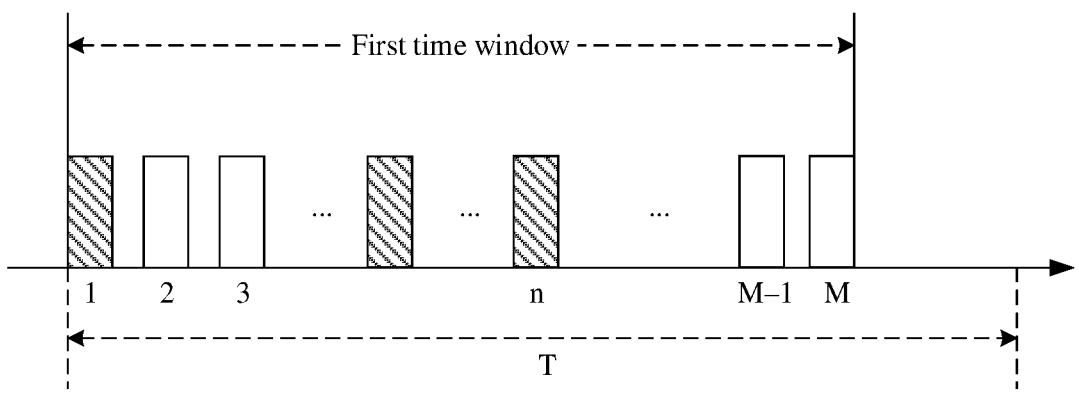

FIG. 5a to FIG. 5c are other schematic diagrams in which a first sidelink device sends first sidelink resource information according to the embodiments. FIG. 5a to FIG. 5c are used to describe a function of the second indication information in this embodiment. In FIG. 5a to FIG. 5c, a rectangular box indicates a timeslot in the first time window, and three rectangular boxes filled with oblique lines indicate that the first sidelink device sends the first sidelink resource information in these timeslots.

The first sidelink device sends the second indication information to the second sidelink device. The second indication information may have different values, indicating different content. When a value of the second indication information may be a first value, the first value indicates that the first sidelink device is to send the reservation information in an $n^{th}$ timeslot of the first time window, send the reservation information or the auxiliary information in an $(n+G1)^{th}$ timeslot, and send the auxiliary information in an $(n+G2)^{th}$ timeslot, where n, G1, and G2 are all integers. A relationship between n, G1, and G2 may be: $n \leq M-2$, and $1 \leq G1 < G2 \leq M-n$.

FIG. 5a shows a case in which the value of the second indication information is the first value. It is assumed that the second sidelink device receives, in a time sequence, the first sidelink resource information sent in the three timeslots. Based on the second indication information, the second sidelink device can learn that the first sidelink device is to send the reservation information in the $n^{th}$ timeslot, and a resource indicated by the reservation information is reserved for the first sidelink device. In addition, the second sidelink device can further learn that the first sidelink device is to send the auxiliary information in the $(n+G1)^{th}$ timeslot and send the auxiliary information in the $(n+G2)^{th}$ timeslot. For example, $M=32$, $n=1$, $G1=6$, and $G2=9$. The value of the second indication information may be "00". In this case, the second information indicates that the first sidelink device is to send the reservation information in the first timeslot, the first sidelink device is to send the auxiliary information in the seventh timeslot, and the first sidelink device is to send the auxiliary information in the tenth timeslot. Therefore, the second sidelink device can learn, only by receiving the information sent by the first sidelink device in the first timeslot, that information to be sent by the first sidelink device in the seventh timeslot and the tenth timeslot is the auxiliary information. Therefore, the second sidelink device can determine, based on the second indication information, whether to detect and when to detect the corresponding auxiliary information.

FIG. 5b shows a case in which a value of the second indication information is a second value. When the value of the second indication information is the second value, the second value indicates that the first sidelink device is to send the auxiliary information in an $n^{th}$ timeslot of the first time window, send the reservation information in an $(n-G3)^{th}$ timeslot, and send the auxiliary information in an $(n+G4)^{th}$ timeslot, where n, G3, and G4 are all integers. A relationship between n, G3, and G4 may be: $1 < n < M$, $G3 < n$, and $G4 \leq M-n$.

It is also assumed that the second sidelink device receives, in a time sequence, the first sidelink resource information sent in the three timeslots. Before receiving the information sent in the $n^{th}$ timeslot, the second sidelink device has received information sent by the first sidelink device before the $n^{th}$ timeslot. Based on the second indication information, the second sidelink device can learn that the first sidelink device sends the auxiliary information in the $n^{th}$ timeslot. In addition, the second sidelink device can further learn that the first sidelink device is to send the reservation information in the $(n-G3)^{th}$ timeslot, and send the auxiliary information in the $(n+G4)^{th}$ timeslot. For example, $M=32$, $n=5$, $G3=4$, and $G4=20$. The value of the second indication information may be "01". In this case, the second information indicates that the first sidelink device is to send the reservation information in the first timeslot, the first sidelink device is to send the auxiliary information in the fifth timeslot, and the first sidelink device is to send the auxiliary information in the twenty-fifth timeslot. Therefore, the second sidelink device can learn, only by receiving the information sent by the first sidelink device in the fifth timeslot, whether information sent by the first sidelink device in the fifth timeslot and the twenty-fifth timeslot is the reservation information or the auxiliary information. Further, due to impact of half-duplex, the second device may not detect the second indication information in the timeslot 1 because the second device is sending data in the timeslot 1. If indication statuses of the reservation information or the auxiliary information in the timeslot 1 and a timeslot 15 are further indicated in the timeslot n=5, the impact caused by the half-duplex can be further overcome.

FIG. 5c shows a case in which a value of the second indication information is a third value. When the value of the second indication information is the third value, the third value indicates that the first sidelink device is to send the auxiliary information in an $n^{th}$ timeslot of the first time window, send the auxiliary information in an $(n-G5)^{th}$ timeslot, and send the reservation information in an $(n-G6)^{th}$ timeslot, where n, G5, and G6 are all integers. For example, a relationship between n, G5, and G6 may be: $2<n \leq M$, and $1 \leq G5 < G6 < n$.

It is also assumed that the second sidelink device receives, in a time sequence, the first sidelink resource information sent in the three timeslots. Before receiving the information sent in the $n^{th}$ timeslot, the second sidelink device has received the information sent by the first sidelink device in the two timeslots before the $n^{th}$ timeslot. Based on the second indication information, the second sidelink device can learn that the first sidelink device sends the auxiliary information in the $n^{th}$ timeslot. In addition, the second sidelink device can further learn that the first sidelink device is to send the auxiliary information in the $(n-G5)^{th}$ timeslot, and send the reservation information in the $(n-G6)^{th}$ timeslot. For example, M=32, n=20, G5=14, and G6=19. The value of the second indication information may be "10". In this case, the second information indicates that the first sidelink device is to send the reservation information in the first timeslot, the first sidelink device is to send the auxiliary information in the sixth timeslot, and the first sidelink device is to send the auxiliary information in the twentieth timeslot. Therefore, the second sidelink device can learn, only by receiving the information sent by the first sidelink device in the twentieth timeslot, that information sent by the first sidelink device in the first timeslot and the sixth timeslot is the auxiliary information.

In the embodiments in FIG. 5a to FIG. 5c, the second indication information may be sent in the $n^{th}$ timeslot of the first time window. In this case, when receiving the second indication information in the $n^{th}$ timeslot, the second sidelink device can learn whether information received in a current timeslot is the auxiliary information or the reservation information and whether information sent in other timeslots is the auxiliary information or the reservation information.

In the embodiments shown in FIG. 4 and FIG. 5a to FIG. 5c, the first sidelink resource information includes the reservation information and the auxiliary information, and the reservation information and the auxiliary information are sent by the first sidelink device in different timeslots of the first time window. This case is indicated by using the second value of the first indication information. An embodiment may further provide an optional implementation. A value of the first indication information may be a third value, and the third value also indicates that the first sidelink resource information includes the reservation information and the auxiliary information. However, different from the case in which the value of the first indication information is the second value, in this case, the reservation information and the auxiliary information are not resource information sent in different timeslots. The reservation information and the auxiliary information may be resource information sent by the first sidelink device in a same timeslot. The reservation information indicates the resource reserved for the first sidelink device. The auxiliary information indicates the auxiliary resource. The auxiliary resource is the resource reserved by the first sidelink device for the second sidelink device or the resource excluded by the first sidelink device for the second sidelink device. In addition, the auxiliary resource is adjacent to the resource reserved by the first sidelink device in frequency domain. The third value may be, for example, "11", and indicates that the first sidelink resource information includes the reservation information and the auxiliary information, and the resource indicated by the reservation information is adjacent to the resource indicated by the auxiliary information in frequency domain.

The reservation information in the first sidelink resource information may be in the first level SCI, and the auxiliary information in the first sidelink resource information may be in the second level SCI. Similarly, "RA: frequency" in the first level SCI indicates frequency domain information of the resource reserved by the first sidelink device, "RA: time" in the first level SCI indicates time domain information of the resource reserved by the first sidelink device, and "Period" in the first level SCI indicates period information of the resource reserved by the first sidelink device. The first level SCI further includes another field indicating the resource reserved by the first sidelink device. Details are not described herein. The auxiliary information may be in the second level SCI. A new field may be defined in the second level SCI to indicate the auxiliary resource, or a new format of the second level SCI is added to indicate the auxiliary resource. Content of the new format of the second level SCI may include fields indicating information such as time-frequency information, period information, and a priority of the auxiliary resource. That the resource reserved by the first sidelink device is adjacent to the auxiliary resource in frequency domain may mean that a frequency domain end point of the resource reserved by the first sidelink device overlaps a frequency domain start point of the auxiliary resource, or a frequency domain start point of the resource reserved by the first sidelink device overlaps a frequency domain end point of the auxiliary resource. Therefore, discontinuity between the auxiliary resource and the resource reserved by the first sidelink device can be avoided, to reduce resource fragments, and improve resource usage efficiency of an entire system.

As an optional implementation, a value of the first indication information may be a fourth value, and the fourth value indicates that the first sidelink resource information is the reservation information. In this case, a resource indicated by the first sidelink resource information is the resource reserved by the first sidelink device, and the first sidelink resource information does not include the auxiliary information. When receiving the first indication information and the first sidelink resource information, the second sidelink device can learn that the resource indicated by the first sidelink resource information is reserved by the first sidelink device for the first sidelink device, the first sidelink device is to use the resource to perform data transmission, and the second sidelink device cannot select the resource to perform data transmission. The fourth value may be, for example, "00".

With reference to the foregoing embodiments shown in FIG. 3 to FIG. 5c, possible values and indicated content of the first indication information are summarized as shown in Table 3. Table 3 shows content indicated by the first indication information when values of the first indication information are different. Table 3 is merely an example, and the value of the first indication information is not limited to cases enumerated in Table 3. In Table 3, for example, a 2-bit field is used for the first indication information.

TABLE 3

A 2-bit field indicates the value and the indicated content of the first indication information

| Value of the first indication information | Indicated content of the first indication information |
|---|---|
| 00 | The first sidelink resource information is the reservation information |
| 01 | The first sidelink resource information is the auxiliary information |
| 10 | The first sidelink resource information includes the reservation information and the auxiliary information, and the reservation information and the auxiliary information are resource information sent by the first sidelink device in different timeslots of the first time window |
| 11 | The first sidelink resource information includes the reservation information and the auxiliary information, and the resource indicated by the reservation information is adjacent to the resource indicated by the auxiliary information in frequency domain |

When the first sidelink device may further send the second indication information to the second sidelink device, the first indication information and the second indication information may be indicated in a same field. In this case, cases including the value of the second indication information may be summarized as shown in Table 4. In Table 4, a 4-bit field indicates the first indication information and the second indication information. In Table 4, the first two code points of a field indicate the first indication information. When the first indication information indicates that the first sidelink resource information includes the reservation information sent in at least one first timeslot and the auxiliary information sent in at least one second timeslot, the last two code points of the field indicate the second indication information.

As shown in Table 4, when a value of indication information is "0000", "0001", "0010", or "0011", the first two code points "00" are a value of the first indication information, and "00" indicates that the first sidelink resource information is the reservation information. In this case, no second indication information exists. Therefore, regardless of a value of the last two code points, "0000", "0001", "0010", or "0011" indicates that the first sidelink resource information is the reservation information.

When a value of indication information is "0100", "0101", "0110", or "0111", the first two code points "01" are a value of the first indication information, and "01" indicates that the first sidelink resource information is the auxiliary information. In this case, no second indication information exists. Therefore, regardless of a value of the last two code points, "0100", "0101", "0110", or "0111" indicates that the first sidelink resource information is the auxiliary information.

When a value of indication information is "1100", "1101", "1110", or "1111", the first two code points "11" are a value of the first indication information, "11" indicates that the first sidelink resource information includes the reservation information and the auxiliary information, and the resource indicated by the reservation information is adjacent to the resource indicated by the auxiliary information in frequency domain. In this case, the second indication information does not exist. Therefore, regardless of a value of the last two code points, "1100", "1101", "1110", or "1111" indicates same content.

A case in which a value of indication information is "1000", "1001", or "1010" is different from the foregoing cases. The first two code points "10" are a value of the first indication information and indicate that the first sidelink resource information includes the reservation information and the auxiliary information. The last two code points are a value of the second indication information and indicate whether resource information sent in the three timeslots is the reservation information or the auxiliary information.

Therefore, when the value of the indication information is 1000, it indicates that the first sidelink resource information includes the reservation information and the auxiliary information, and the first sidelink device is to send the reservation information in the $n^{th}$ timeslot of the first time window, send the reservation information or the auxiliary information in the $(n+G1)^{th}$ timeslot, and send the auxiliary information in the $(n+G2)^{th}$ timeslot.

When the value of the indication information is 1001, it indicates that the first sidelink resource information includes the reservation information and the auxiliary information, and the first sidelink device is to send the auxiliary information in the $n^{th}$ timeslot of the first time window, send the reservation information in the $(n-G3)^{th}$ timeslot, and send the auxiliary information in the $(n+G4)^{th}$ timeslot.

When the value of the indication information is 1010, it indicates that the first sidelink resource information includes the reservation information and the auxiliary information, and the first sidelink device is to send the auxiliary information in the $n^{th}$ timeslot of the first time window, send the auxiliary information in the $(n-G5)^{th}$ timeslot, and send the reservation information in the $(n-G6)^{th}$ timeslot.

TABLE 4

A 4-bit field indicates the value and the indicated content of the indication information

| Value of the indication information | Indicated content |
|---|---|
| 0000 0001 0010 0011 | The first sidelink resource information is the reservation information |
| 0100 0101 0110 0111 | The first sidelink resource information is the auxiliary information |
| 1000 | The first sidelink resource information includes the reservation information and the auxiliary information, and the first sidelink device is to send the reservation information in the $n^{th}$ timeslot of the first time window, send the reservation information or the auxiliary information in the $(n + G1)^{th}$ timeslot, and send the auxiliary information in the $(n + G2)^{th}$ timeslot |

TABLE 4-continued

A 4-bit field indicates the value and the indicated
content of the indication information

| Value of the indication information | Indicated content |
|---|---|
| 1001 | The first sidelink resource information includes the reservation information and the auxiliary information, and the first sidelink device is to send the auxiliary information in the $n^{th}$ timeslot of the first time window, send the reservation information in the $(n - G3)^{th}$ timeslot, and send the auxiliary information in the $(n + G4)^{th}$ timeslot |
| 1010 | The first sidelink resource information includes the reservation information and the auxiliary information, and the first sidelink device is to send the auxiliary information in the $n^{th}$ timeslot of the first time window, send the auxiliary information in the $(n - G5)^{th}$ timeslot, and send the reservation information in the $(n - G6)^{th}$ timeslot |
| 1100 1101 1110 1111 | The first sidelink resource information includes the reservation information and the auxiliary information, and the resource indicated by the reservation information is adjacent to the resource indicated by the auxiliary information in frequency domain |

It may be understood that, in Table 4, the values of the indication information are merely examples, and different values may indicate the indicated content in Table 4. Similarly, a field having more bits may indicate the first indication information and/or the second indication information.

In this embodiment, the first indication information may have different values, to indicate different content. When the first indication information is the first value, the second value, or the third value, it indicates that the first sidelink resource information includes the auxiliary information. When the first indication information is the first value, it indicates that the first sidelink resource information is the auxiliary information. When the first indication information is the second value, it indicates that the first sidelink resource information includes the auxiliary information and the reservation information. When the first indication information is the third value, it indicates that the first sidelink resource information includes the auxiliary information and the reservation information, and the auxiliary resource indicated by the auxiliary information is adjacent to the resource that is reserved for the first sidelink device and that is indicated by the reservation information in frequency domain. After receiving the first indication information and the first sidelink resource information, the second sidelink device can learn a resource status of the resource pool or a resource occupation status of another surrounding communication device with which the second sidelink device cannot directly communicate, to avoid a resource conflict between the second sidelink device and another communication device in a resource selection process.

Different from the case in which the first indication information has different values to indicate different content, the first indication information may indicate, in another form, whether the auxiliary information exists in the first sidelink resource information. Table 5 shows some content of second level SCI according to an embodiment. Table 5 is merely an example, and the second level SCI may further include other content not shown in Table 5.

TABLE 5

Some content of the second level SCI

| Field | Bit |
|---|---|
| Source ID | 8 |
| Destination ID | 16 |

In Table 5, the first column indicates related fields in the second level SCI, and the second column indicates a quantity of bits used for the field. The source ID field in the second row in Table 5 indicates some bits in a source ID of a layer 2, and 8 bits are available for the information. The destination ID field in the third row in Table 5 indicates some bits in a destination ID of a layer 2, and 16 bits are available for the information. For example, identifiers of the layers 2 corresponding to the source ID and the destination ID are both 24 bits, and 8 bits or 16 bits in Table 5 may be least significant bits or most significant bits of the 24 bits. Optionally, the source ID and the destination ID may be related to a V2X service.

The first indication information may include the source ID field and/or the destination ID field. When a value of the source ID field and/or a value of the destination ID field fall/falls within a first value range, the first indication information indicates that the first sidelink resource information includes indication information of a time-frequency resource for current transmission and/or indication information of the reserved resource. When a value of the source ID field and/or a value of the destination ID field fall/falls within a second value range, the first indication information indicates that the first sidelink resource information includes the auxiliary information. For example, the first indication information includes the source ID field. A value of the source ID may fall within a value range 1 to 99, a value range 1 to X of the source ID field indicates ID information of a source ID of a layer 2 related to a V2X service, and a value range X+1 to 99 of the source ID field indicates that the first sidelink resource information includes the auxiliary information. The second sidelink device can learn, based on the received first indication information, that the first sidelink resource information includes the auxiliary information.

The first sidelink resource information may be in the first level SCI, and the auxiliary information may be a field in the first level SCI and indicates the auxiliary resource. "RA: frequency" in the first level SCI may indicate frequency domain information of the auxiliary resource, "RA: time" in the first level SCI may indicate time domain information of the auxiliary resource, "Period" in the first level SCI may indicate period information of the auxiliary resource, and the first level SCI may further have another parameter for indicating other information of the auxiliary resource.

The first level SCI and the second level SCI are sent in stages in a same timeslot of the first time window. For example, the first level SCI and the second level SCI are sent in stages in the $n^{th}$ timeslot of the first time window. The first level SCI carries the first sidelink resource information, the second level SCI carries the first indication information, and a value of the source ID field in the second level SCI falls within X+1 to 99. In this case, the first indication information indicates that resource information sent by the first sidelink device in the $n^{th}$ timeslot is the auxiliary information. In the same first time window, the first level SCI and the second level SCI are sent in stages in an $(n+G7)^{th}$ timeslot. The first level SCI carries the first sidelink resource information, the second level SCI carries the first indication information, and a value of the source ID field in the second level SCI falls within 1 to X. In this case, the first indication information indicates that resource information sent by the first sidelink device in the $(n+G7)^{th}$ timeslot is the reservation information.

According to the communication method provided in this embodiment, the first sidelink device sends the first indication information and the first sidelink resource information to the second sidelink device, and the second sidelink device can learn, based on the received first indication information and first sidelink resource information, that the first sidelink resource information includes the auxiliary information that assists the second sidelink device in resource selection, and then may perform resource selection based on the auxiliary information, to avoid a resource conflict with another communication device.

In this embodiment, the auxiliary information may be the information indicating the auxiliary resource, and the auxiliary resource includes the resource reserved by the first sidelink device for the second sidelink device and/or the resource excluded by the first sidelink device for the second sidelink device. During determining of the auxiliary resource, available resources and unavailable resources may need to be identified based on a measurement result of the resource pool. An availability or inavailability criterion of a resource may be compared with a preset signal quality threshold. When detected signal quality is higher than the preset threshold, it indicates that relatively severe interference is caused for the resource or the resource is unavailable. On the contrary, when detected signal quality is lower than the preset threshold, it indicates that the resource is relatively "clean" or available. Optionally, the signal quality threshold herein may be related to a service priority of to-be-transmitted data. For example, a service having a higher priority may require more available resources and may indicate a higher preset threshold, so that fewer resources can be excluded, to select more available resources. For another example, a service having a lower priority may require less available resources and may indicate a lower preset threshold, so that more resources can be excluded and fewer available resources can be potentially selected, to reduce impact on transmission of a high-priority service. Therefore, during determining of the auxiliary resource, it is necessary to learn about information about a priority of a related service, to select a proper resource. In a process of determining the auxiliary information, the first sidelink device determines the auxiliary information based on a first priority. The first priority may be the same as a service priority of the first sidelink device, or the first priority may be the same as a service priority of the second sidelink device.

The service priority of the first sidelink device is a priority of a service to be transmitted by the first sidelink device on a selected resource, or a priority indicated by the first sidelink device in sidelink link control information SCI. The service priority of the second sidelink device is a priority of a service to be transmitted by the second sidelink device, or a priority indicated by the second sidelink device in sidelink link control information SCI.

The first sidelink device determines, based on the first priority, whether a current resource is reserved for the first sidelink device or reserved for the second sidelink device, or is reserved for the first sidelink device in the first timeslot or reserved for the second sidelink device in the second timeslot.

The first sidelink device may determine, based on first information, whether the first priority is the same as the service priority of the first sidelink device or the service priority of the second sidelink device. The first information may be indication signaling on the resource pool. A plurality of signaling parameter sets may be configured on the resource pool and the indication signaling herein may be one of these signaling parameter sets. The configuration information set indicating the resource pool may be an RRC message or may be a system message. This is not limited. Different values of the signaling can indicate whether the first priority is the same as the service priority of the first sidelink device or the service priority of the second sidelink device.

Alternatively, the first sidelink device may determine, based on second information, whether the first priority is the same as the service priority of the first sidelink device or the service priority of the second sidelink device. The second information may include a measurement result of the first sidelink device for channel quality. A CBR measurement result is used as an example. When a CBR measured by the terminal device on the resource pool is greater than or equal to a first threshold, the first priority is the same as the service priority of the first sidelink device; or when a CBR measured by the terminal device on the resource pool is less than or equal to the first threshold, the first priority is the same as the service priority of the second sidelink device. This occurs for the following reason: A larger CBR indicates that a channel is more crowded and fewer resources can be selected. In this case, the service priority of the first device is used, so that resource selection conflicts can be reduced, and the reserved resource and the resource of the auxiliary information can be selected by using only one unified priority. Similarly, a smaller CBR indicates that a channel is idle and more resources can be selected. In this case, the service priority of the second device is used, so that a required resource in the auxiliary information can be selected in an optimal manner, to improve pertinence of the auxiliary information, thereby improving performance of the entire system.

In an optional implementation, when the channel quality is less than or equal to a first threshold, the first priority is the same as a higher priority in the service priority of the first sidelink device and the service priority of the second sidelink device; or when the channel quality is greater than or equal to the first threshold, the first priority is the same as a lower priority in the service priority of the first sidelink device and the service priority of the second sidelink device. When the channel quality is equal to the first threshold, the first priority may be the same as the higher priority in the service priority of the first sidelink device and the service priority of the second sidelink device, or the first priority may be the same as the lower priority in the service priority of the first sidelink device and the service priority of the second sidelink device. The first threshold may be configured or preconfigured by a network device. When a channel is relatively idle, a relatively large quantity of resources in the system are optional, and the auxiliary resource may be determined by using the higher priority as the first priority, to select as many resources as possible for the auxiliary information, thereby improving efficiency and quality of the auxiliary information. On the contrary, when a channel is relatively crowded, a relatively small quantity of resources in the system are optional, and the auxiliary resource may be determined by using the lower priority as the first priority, to reduce impact on another higher priority service when a resource is selected for determining the auxiliary information.

The foregoing describes the communication method in the embodiments and the following describes communication apparatuses in the embodiments. For example, the apparatus may use the method related to the solutions shown in FIG. 2 to FIG. 5c. Because a problem resolving principle of the method is similar to that of the apparatus, reference can be made between implementations of the apparatus and the method, and repeated parts are not described again.

An embodiment may further provide a sidelink device. The sidelink device may be configured to perform the actions performed by the first sidelink device in the method shown in FIG. 2 to FIG. 5c.

The sidelink device includes: a processing module, configured to determine first indication information and first sidelink resource information; and a transceiver module, configured to send the first indication information and the first sidelink resource information to a second sidelink device.

The first indication information indicates that the first sidelink resource information includes auxiliary information.

The auxiliary information is used to assist the second sidelink device in resource selection.

In this embodiment, the sidelink device may be the first sidelink device in the method embodiments, and the first sidelink device may send the first indication information and the first sidelink resource information to the second sidelink device. The first indication information indicates that the first sidelink resource information includes the auxiliary information. After receiving the first indication information and the auxiliary information, the second sidelink device can learn about a related resource status, such as channel measurement information of a resource pool, and a resource occupation status of another communication device with which the second sidelink device cannot directly communicate. The second sidelink device may perform resource selection based on the auxiliary information, to obtain, through resource selection, an available resource that can be used to send information, to avoid a resource conflict with another communication device.

An embodiment may further provide a sidelink device. The sidelink device may be configured to perform the actions performed by the second sidelink device in the method shown in FIG. 2 to FIG. 5c.

The sidelink device includes: a transceiver module, configured to receive first indication information and first sidelink resource information that are sent by a first sidelink device, where the first indication information indicates that the first sidelink resource information includes auxiliary information; and the auxiliary information is used to assist the second sidelink device in resource selection; and a processing module, configured to select a resource based on the first indication information and the auxiliary information.

The sidelink device provided in the embodiments may be further configured to perform the method in any possible implementation of the foregoing method embodiments in FIG. 3 to FIG. 5c. As shown in FIG. 3 to FIG. 5c, actions may be performed by the first sidelink device and the second sidelink device. Details are not described herein again.

Figure 6:
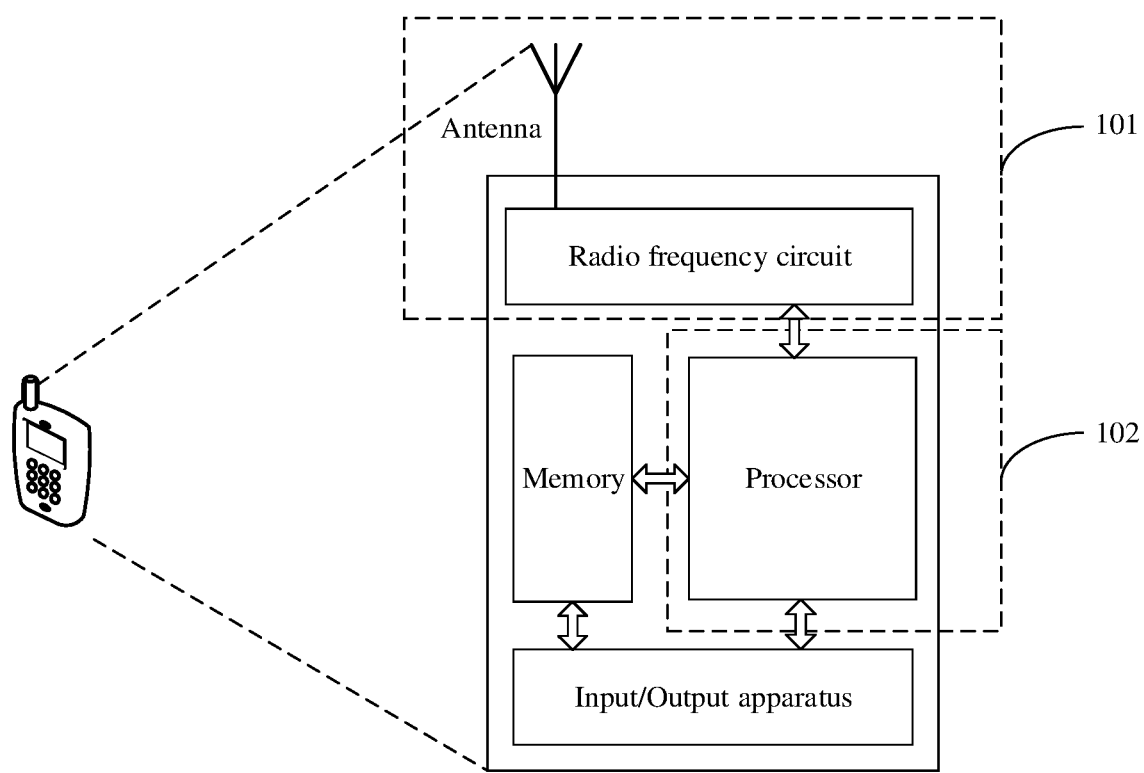
FIG. 6 is a schematic diagram of a simplified structure of a terminal device according to an embodiment.

The sidelink device in the embodiments may be a terminal device. FIG. 6 is a schematic diagram of a simplified structure of a terminal device according to an embodiment. The terminal device shown in FIG. 6 includes a processor, a memory, a radio frequency circuit, an antenna, and an input/output apparatus. The processor may be configured to: process a communication protocol and communication data, control the terminal device, execute a software program, process data of the software program, and the like. The memory may be configured to store a software program and data. The radio frequency circuit may be configured to perform conversion between a baseband signal and a radio frequency signal and process the radio frequency signal. The antenna may be configured to receive and send radio frequency signals in a form of an electromagnetic wave. The input/output apparatus, for example, a touchscreen, a display screen, or a keyboard, may be configured to receive data entered by a user and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data. For ease of description, only one memory and one processor are shown in FIG. 6. An actual terminal device product may include one or more processors and one or more memories. The memory may also be referred to as a storage medium, a storage device, or the like. The memory may be disposed independent of the processor or may be integrated with the processor. This is not limited in this embodiment.

In this embodiment, the antenna and the radio frequency circuit that have sending and receiving functions may be considered as a transceiver module of the terminal device, and the processor that has a processing function may be considered as a processing module of the terminal device. As shown in FIG. 6, the terminal device includes a transceiver module 101 and a processing module 102. The transceiver module may also be referred to as a transceiver, a transceiver apparatus, or the like. The processing module may also be referred to as a processor, a processing board, a processing apparatus, or the like. Optionally, a component configured to implement a receiving function in the transceiver module 101 may be considered as a receiving module, and a component configured to implement a sending function in the transceiver module 101 may be considered as a sending module, that is, the transceiver module 101 includes the receiving module and the sending module. The transceiver module sometimes may also be referred to as a transceiver, a transceiver circuit, or the like. The receiving module sometimes may also be referred to as a receiver, a receiver circuit, or the like. The sending module sometimes may also be referred to as a transmitter, a transmitter circuit, or the like.

It should be understood that the transceiver module 101 is configured to perform the sending operation and the receiving operation of the sidelink device in the foregoing method embodiments, and the processing module 102 is configured to perform operations of the sidelink device other than the sending operation and the receiving operation in the foregoing method embodiments.

For example, in an implementation, the transceiver module 101 is configured to perform the sending operation of the first sidelink device in S302 in FIG. 3, and/or the transceiver module 101 is further configured to perform another sending/receiving step of the terminal device in the embodiments.

When the sidelink device is a chip-type apparatus or circuit, the chip apparatus may include a transceiver module and a processing module. The transceiver module may be an input/output circuit and/or a communication interface. The processing module is a processor, a microprocessor, or an integrated circuit integrated onto the chip.

Figure 7:
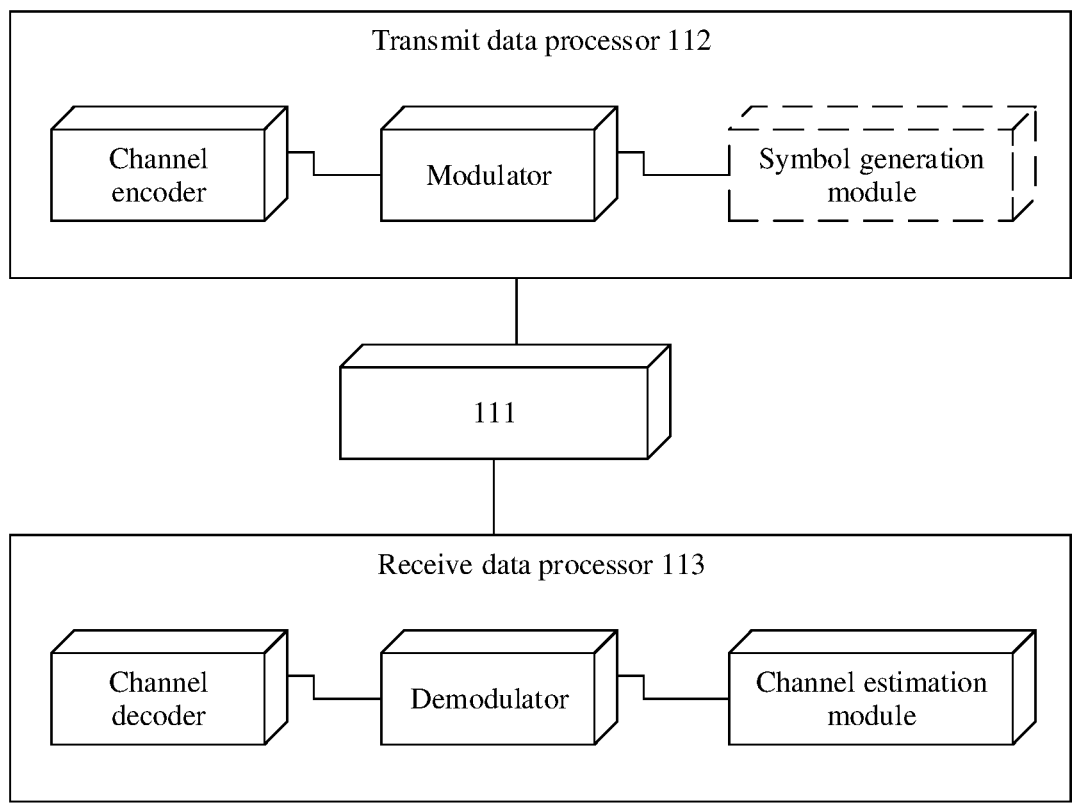
FIG. 7 is a schematic diagram of a structure of a sidelink device according to an embodiment.

When the sidelink device in the embodiments is a terminal device, refer to a device shown in FIG. 7. In FIG. 7, the device includes a processor 111, a data sending processor 112, and a data receiving processor 113. The processing module in the foregoing embodiment may be the processor 111 in FIG. 7 and may perform a corresponding function. The transceiver module in the foregoing embodiment may be the data sending processor 112 and/or the data receiving processor 113 in FIG. 7. Although FIG. 7 shows a channel encoder and a channel decoder, it may be understood that these modules do not constitute a limiting description of this embodiment but are merely an example.

Figure 8:
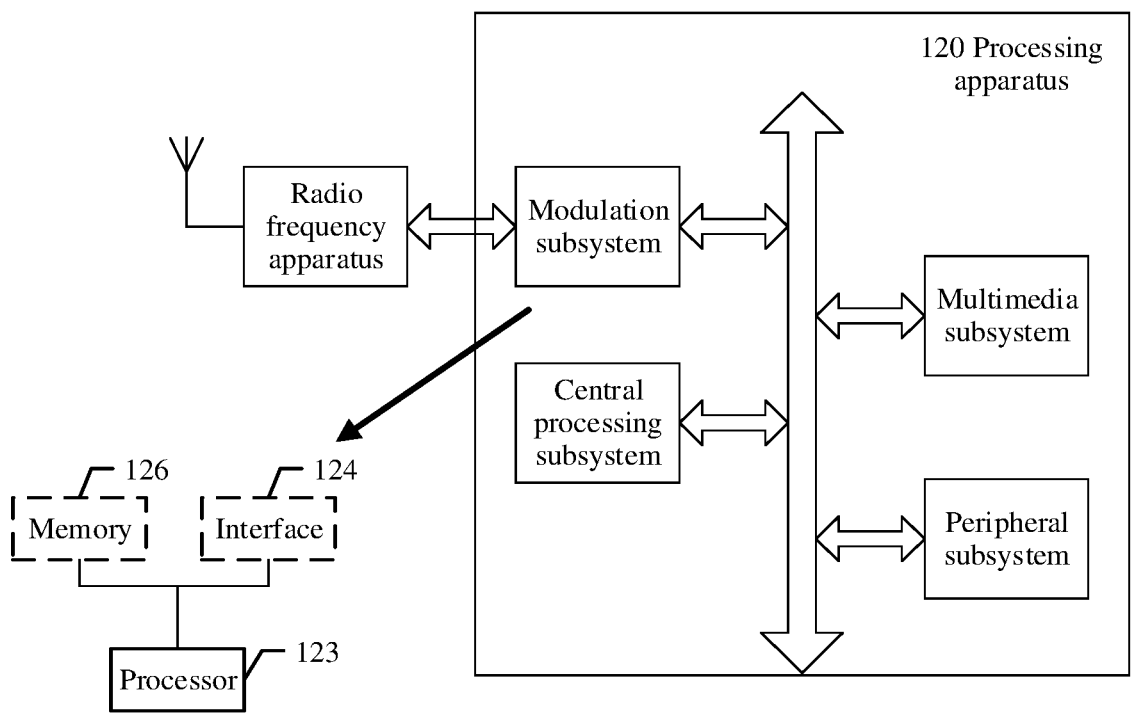
FIG. 8 is a schematic diagram of another structure of a sidelink device according to an embodiment.

FIG. 8 shows another form of this embodiment. A processing apparatus 120 includes modules such as a modulation subsystem, a central processing subsystem, and a peripheral subsystem. The sidelink device in the embodiments may be used as the modulation subsystem. The modulation subsystem may include a processor 123 and an interface 124. The processor 123 completes a function of the foregoing processing module, and the interface 124 completes a function of the foregoing transceiver module. As another variant, the modulation subsystem includes a memory 126, a processor 123, and a program that is stored in the memory 126 and that can run on the processor. When executing the program, the processor 123 implements the method on a terminal device side in the foregoing method embodiments. It should be noted that the memory 126 may be nonvolatile, may be volatile, may be located in the modulation subsystem or may be located in the processing apparatus 120, provided that the memory 126 can be connected to the processor 123.

Figure 9:
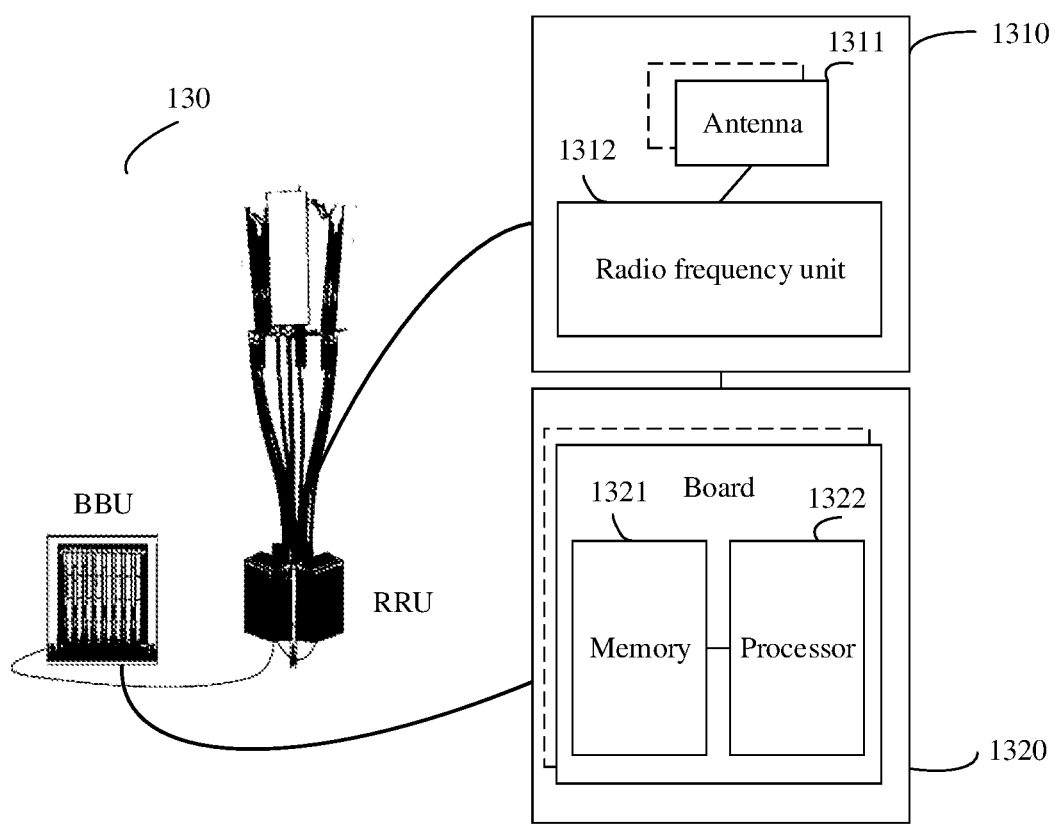
FIG. 9 is a schematic diagram of another structure of a sidelink device according to an embodiment.

Alternatively, the sidelink device in the embodiments may be a network device. The network device may be shown in FIG. 9. An apparatus 130 includes one or more radio frequency units, such as a remote radio unit (RRU) 1310 and one or more baseband units (BBU) 1320, which may also be referred to as digital units (DU). The RRU 1310 may be referred to as a transceiver module. Optionally, the transceiver module may also be referred to as a transceiver, a transceiver circuit, or the like, and may include at least one antenna 1311 and a radio frequency unit 1312. The RRU 1310 part may be configured to send/receive a radio frequency signal and perform conversion between a radio frequency signal and a baseband signal, for example, is configured to send indication information to a terminal device. The BBU 1310 part may be configured to perform baseband processing, control the base station, and the like. The RRU 1310 and the BBU 1320 may be physically disposed together, or may be physically disposed separately, that is, a distributed base station.

The BBU 1320 is a control center of the base station. The BBU 1320 may also be referred to as a processing module, may correspond to the processing module 820 in FIG. 8, and may be configured to implement a baseband processing function, such as channel coding, multiplexing, modulation, or spread spectrum. For example, the BBU (processing module) may be configured to control the base station to perform the operation procedure related to the network device in the foregoing method embodiments, for example, generate the foregoing indication information.

In an example, the BBU 1320 may include one or more boards. A plurality of boards may jointly support a radio access network of a single access standard or may separately support radio access networks of different access standards (for example, an LTE network, a 5G network, and another network). The BBU 1320 further includes a memory 1321 and a processor 1322. The memory 1321 is configured to store necessary instructions and data. The processor 1322 is configured to control the base station to perform a necessary action, for example, is configured to control the base station to perform the operation procedure related to the network device in the foregoing method embodiments. The memory 1321 and the processor 1322 may serve one or more boards. In other words, a memory and a processor may be deployed on each board. Alternatively, a plurality of boards may share a same memory and a same processor. In addition, a necessary circuit may be further disposed on each board.

The foregoing descriptions are merely implementations, but are not intended to limit the scope of the embodiments. Any variation or replacement readily figured out by a person skilled in the art shall fall within the scope of the embodiments.

What is claimed is:

1. A communication method, comprising:
determining, by a first sidelink device, first indication information and first sidelink resource information, wherein the first indication information indicates that the first sidelink resource information comprises auxiliary information; and
sending, by the first sidelink device, the first indication information and the first sidelink resource information to a second sidelink device, wherein
the auxiliary information is used to assist the second sidelink device in resource selection,
wherein the first sidelink resource information further comprises reservation information, and the reservation information indicates a resource reserved by the first sidelink device,
sending, by the first sidelink device, the first indication information and the first sidelink resource information to the second sidelink device further comprises:
sending, by the first sidelink device, the first sidelink resource information in a first time window; and
the first time window comprises a plurality of timeslots, and the first sidelink resource information comprises the reservation information sent in a first timeslot and the auxiliary information sent in a second timeslot, wherein the first timeslot is earlier than the second timeslot in terms of time.

2. The communication method according to claim 1, wherein
a value of the first indication information is a first value, and the first value indicates that the first sidelink resource information is the auxiliary information.

3. The communication method according to claim 2, wherein
the value of the first indication information is a second value, and the second value indicates that the first sidelink resource information comprises the auxiliary information and the reservation information.

4. The communication method according to claim 1, wherein
the first indication information and/or the first sidelink resource information is in sidelink control information (SCI).

5. The communication method according to claim 1, wherein
the auxiliary information is information about an auxiliary resource, and the auxiliary resource comprises at least one of the following resources:
a resource reserved by the first sidelink device for the second sidelink device, and a resource excluded by the first sidelink device for the second sidelink device.

6. A communication method, comprising:
receiving, by a second sidelink device, first indication information and first sidelink resource information, wherein the first indication information indicates that the first sidelink resource information comprises auxiliary information; and
selecting, by the second sidelink device, a resource based on the first indication information and the auxiliary information,
wherein the first sidelink resource information further comprises reservation information, and the reservation information indicates a resource reserved by a first sidelink device,
wherein the receiving, by the second sidelink device, the first indication information and the first sidelink resource information comprises: receiving, by the second sidelink device, the first sidelink resource information in a first time window; and
the first time window comprises a plurality of timeslots, and the first sidelink resource information comprises the reservation information sent in a first timeslot and the auxiliary information sent in a second timeslot,
wherein the first timeslot is earlier than the second timeslot in terms of time.

7. The communication method according to claim 6, wherein
a value of the first indication information is a first value, and the first value indicates that the first sidelink resource information is the auxiliary information.

8. The communication method according to claim 6, wherein
the first indication information and/or the first sidelink resource information is in sidelink control information (SCI).

9. The communication method according to claim 6, wherein
the auxiliary information is information about an auxiliary resource, and the auxiliary resource comprises at least one of the following resources:
a resource reserved by a first sidelink device for the second sidelink device, and a resource excluded by the first sidelink device for the second sidelink device.

10. A wireless apparatus, comprising one or more processors; and a memory, wherein the memory stores a computer program, and when executing the computer program stored in the memory, the one or more processors executes operations comprising:
determining, first indication information and first sidelink resource information, wherein the first indication information indicates that the first sidelink resource information comprises auxiliary information; and
sending, the first indication information and the first sidelink resource information to a second sidelink device, wherein
the auxiliary information is used to assist the second sidelink device in resource selection,
wherein the first sidelink resource information further comprises reservation information, and the reservation information indicates a resource reserved by a first sidelink device,
wherein sending the first indication information and the first sidelink resource information to the second sidelink device further comprises:
sending the first sidelink resource information in a first time window; and
the first time window comprises a plurality of timeslots, and the first sidelink resource information comprises the reservation information sent in a first timeslot and the auxiliary information sent in a second timeslot,
wherein the first timeslot is earlier than the second timeslot in terms of time.

11. The wireless apparatus according to claim 10, wherein
a value of the first indication information is a first value, and the first value indicates that the first sidelink resource information is the auxiliary information.

12. The wireless apparatus according to claim 10, wherein
the first indication information and/or the first sidelink resource information is in sidelink control information (SCI).

13. The wireless apparatus according to claim 10, wherein
the auxiliary information is information about an auxiliary resource, and the auxiliary resource comprises at least one of the following resources:
a resource reserved by the first sidelink device for the second sidelink device, and a resource excluded by the first sidelink device for the second sidelink device.

14. A wireless apparatus, comprising one or more processors; and a memory, wherein the memory stores a computer program, and when executing the computer program stored in the memory, the one or more processors executes operations comprising:
receiving, first indication information and first sidelink resource information, wherein the first indication information indicates that the first sidelink resource information comprises auxiliary information; and
selecting, a resource based on the first indication information and the auxiliary information,
wherein the first sidelink resource information further comprises reservation information, and the reservation information indicates a resource reserved by a first sidelink device,
wherein receiving the first indication information and the first sidelink resource information to a second sidelink device further comprises:
receiving the first sidelink resource information in a first time window; and
the first time window comprises a plurality of timeslots, and the first sidelink resource information comprises the reservation information sent in a first timeslot and the auxiliary information sent in a second timeslot,
wherein the first time slot is earlier than the second timeslot in terms of time.

15. The wireless apparatus according to claim 14, wherein
a value of the first indication information is a first value, and the first value indicates that the first sidelink resource information is the auxiliary information.

16. The wireless apparatus according to claim 14, wherein
the first indication information and/or the first sidelink resource information is in sidelink control information (SCI).

17. The wireless apparatus according to claim 14, wherein the auxiliary information is information about an auxiliary resource, and the auxiliary resource comprises at least one of the following resources:
a resource reserved by a first sidelink device for the second sidelink device, and a resource excluded by the first sidelink device for the second sidelink device.

* * * * *